US012747365B2

(12) United States Patent
Fujii et al.

(10) Patent No.: US 12,747,365 B2
(45) Date of Patent: Sep. 29, 2026

(54) PRETREATMENT LIQUID FOR IMPERMEABLE BASE MATERIAL, INK SET, IMAGE RECORDING METHOD, IMAGE RECORDED MATERIAL, AND RECORDING MEDIUM AND METHOD OF PRODUCING SAME

(71) Applicant: FUJIFILM Corporation, Tokyo (JP)

(72) Inventors: Yusuke Fujii, Kanagawa (JP); Ayato Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1033 days.

(21) Appl. No.: 17/526,690

(22) Filed: Nov. 15, 2021

(65) Prior Publication Data

US 2022/0073775 A1 Mar. 10, 2022

Related U.S. Application Data

(63) Continuation of application No. PCT/JP2020/017683, filed on Apr. 24, 2020.

(30) Foreign Application Priority Data

May 17, 2019 (JP) ................................ 2019-094050

(51) Int. Cl.
*C09D 11/54* (2014.01)
*B41M 5/00* (2006.01)
(Continued)

(52) U.S. Cl.
CPC ........... *C09D 11/54* (2013.01); *B41M 5/0011* (2013.01); *B41M 5/52* (2013.01); *C09D 11/033* (2013.01);
(Continued)

(58) Field of Classification Search
None
See application file for complete search history.

(56) References Cited

U.S. PATENT DOCUMENTS

2015/0015639 A1 1/2015 Ito et al.
2019/0010349 A1 1/2019 Shimono et al.
(Continued)

FOREIGN PATENT DOCUMENTS

EP 2 614 964 A2 7/2013
EP 3 263 662 A1 1/2018
(Continued)

OTHER PUBLICATIONS

Machine Translation of JP 2017-128117 (Year: 2017).*
(Continued)

*Primary Examiner* — Christina A Johnson
(74) *Attorney, Agent, or Firm* — Sughrue Mion, PLLC

(57) ABSTRACT

Provided are: a pretreatment liquid for an impermeable base material, including an aggregating agent (A) which contains at least one selected from the group consisting of an organic acid and a polyvalent metal salt, a nitrogen-containing compound (B) which contains at least one selected from the group consisting of ammonia, an amine, and a heterocyclic compound containing a basic nitrogen atom, and resin particles (C), and water; an ink set; an image recording method; an image recorded material; and a recording medium and a method of producing the same.

12 Claims, 3 Drawing Sheets

(51) Int. Cl.

| | |
|---|---|
| ***B41M 5/52*** | (2006.01) |
| ***C09D 11/033*** | (2014.01) |
| ***C09D 11/104*** | (2014.01) |
| ***C09D 11/107*** | (2014.01) |
| ***C09D 11/38*** | (2014.01) |
| ***C09D 11/40*** | (2014.01) |

(52) U.S. Cl.

CPC .......... *C09D 11/104* (2013.01); *C09D 11/107* (2013.01); *C09D 11/38* (2013.01); *C09D 11/40* (2013.01)

(56) References Cited

U.S. PATENT DOCUMENTS

| | | | |
|---|---|---|---|
| 2019/0016911 | A1 | 1/2019 | Okamoto et al. |
| 2020/0131394 | A1 | 4/2020 | Fujii et al. |
| 2020/0216703 | A1 | 7/2020 | Fujii et al. |

FOREIGN PATENT DOCUMENTS

| | | | | | |
|---|---|---|---|---|---|
| JP | 2004-276253 | A | | 10/2004 | |
| JP | 2010-194788 | A | | 9/2010 | |
| JP | 2010-241068 | A | | 10/2010 | |
| JP | 2014-073672 | A | | 4/2014 | |
| JP | 2015-034277 | A | | 2/2015 | |
| JP | 2017-013350 | A | | 1/2017 | |
| JP | 2017-128117 | A | | 7/2017 | |
| WO | 2017/163738 | A1 | | 9/2017 | |
| WO | WO-2017212848 | A1 | * | 12/2017 | ................ B41J 2/01 |
| WO | 2018/016141 | A1 | | 1/2018 | |
| WO | 2018/181992 | A1 | | 10/2018 | |
| WO | WO-2019004485 | A1 | * | 1/2019 | ................ B41J 2/01 |
| WO | 2019/064978 | A1 | | 4/2019 | |

OTHER PUBLICATIONS

Extended European Search Report dated Jun. 17, 2022 from the European Patent Office in EP Application No. 20810036.2.

Office Action issued May 24, 2022 in Japanese Application No. 2021-520670.

Office Action issued Aug. 30, 2022 in Japanese Application No. 2021-520670.

International Search Report dated Jun. 16, 2020 from the International Searching Authority in International Application No. PCT/JP2020/017683.

Written Opinion dated Jun. 16, 2020 from the International Searching Authority in International Application No. PCT/JP2020/017683.

International Preliminary Report on Patentability with the translation of Written Opinion dated Nov. 16, 2021 from the International Bureau in International Application No. PCT/JP2020/017683.

Communication dated Mar. 18, 2025 issued by the European Patent Office in European application No. 20810036.2.

* cited by examiner

PRETREATMENT LIQUID FOR IMPERMEABLE BASE MATERIAL, INK SET, IMAGE RECORDING METHOD, IMAGE RECORDED MATERIAL, AND RECORDING MEDIUM AND METHOD OF PRODUCING SAME

CROSS-REFERENCE TO RELATED APPLICATIONS

This application is a continuation application of International Application No. PCT/JP2020/017683, filed Apr. 24, 2020, the disclosure of which is incorporated herein by reference in its entirety. Further, this application claims priority from Japanese Patent Application No. 2019-094050, filed May 17, 2019, the disclosure of which is incorporated herein by reference in its entirety.

BACKGROUND OF THE INVENTION

1. Field of the Invention

The present disclosure relates to a pretreatment liquid for an impermeable base material, an ink set, an image recording method, an image recorded material, and a recording medium and a method of producing the same.

2. Description of the Related Art

In the related art, in regard to image recording on a plastic film, a technique for recording an image using an ink and a pretreatment liquid has been known.

For example, JP2014-73672A discloses, as an image forming method using an inkjet ink, which enables obtainment of an image with a high image density and high glossiness on a recording medium having low liquid absorbency, improvement of the fixing property, and reduction of feathering and color bleeding, an image forming method including a pretreatment step of attaching a pretreatment liquid on a recording medium, an image forming step of attaching an inkjet ink onto the surface to which the pretreatment liquid has been attached to form an image, and a post-treatment step of attaching a post-treatment liquid onto the surface to which the inkjet ink has been attached to form a protective layer, in which the amount of pure water to be transferred to a coating layer of the recording medium for a contact time of 100 ms, which is measured by a dynamic scanning liquid absorption meter, is in a range of 1 to 10 $mL/m^2$, and at least one of the pretreatment liquid or the post-treatment liquid contains water and an aqueous resin and further contains any of colloidal silica, barium sulfate, or titanium oxide.

Further, WO2018/016141A discloses, as a primer ink for inkjet recording which has excellent preservation stability, is capable of improving the adhesiveness to various recording media formed of plastic films, and is also capable of improving the adhesiveness, the bleeding property, the unevenness, and the water resistance of an image in a case of being printed with an ink composition for inkjet recording, a primer ink for inkjet recording, containing a water-soluble polyvalent metal salt as a component (A), a hydrazine derivative having at least two hydrazine residues as a component (B), at least one of an acrylic emulsion or a vinyl acetate emulsion as a component (C), and water as a component (D).

SUMMARY OF THE INVENTION

However, it was found that in a case where a film is formed by applying a pretreatment liquid containing an aqueous resin (hereinafter, also referred to as a "water-soluble resin") to an impermeable base material, the film to be formed is sticky in some cases.

Further, it was also found that in a case where a film is formed by applying a pretreatment liquid containing an aggregating agent to an impermeable base material, the film to be formed is whitened in some cases.

An object of one aspect of the present disclosure is to provide a pretreatment liquid for an impermeable base material, an ink set, an image recording method, an image recorded material, and a recording medium and a method of producing the same, which enable formation of a film with suppressed stickiness and whitening on an impermeable base material.

Specific means for achieving the above-described objects include the following aspects.

<1> A pretreatment liquid for an impermeable base material, comprising: an aggregating agent (A) which contains at least one selected from the group consisting of an organic acid and a polyvalent metal salt; a nitrogen-containing compound (B) which contains at least one selected from the group consisting of ammonia, an amine, and a heterocyclic compound containing a basic nitrogen atom; resin particles (C); and water.

<2> The pretreatment liquid for an impermeable base material according to <1>, in which the nitrogen-containing compound (B) contains an amine having a boiling point of 100° C. or higher.

<3> The pretreatment liquid for an impermeable base material according to <1> or <2>, in which the nitrogen-containing compound (B) contains an amine having a hydroxy group.

<4> The pretreatment liquid for an impermeable base material according to any one of <1> to <3>, in which the nitrogen-containing compound (B) contains at least one selected from the group consisting of a secondary amine and a tertiary amine.

<5> The pretreatment liquid for an impermeable base material according to any one of <1> to <4>, in which the aggregating agent (A) contains at least one selected from the group consisting of a dicarboxylic acid and a tricarboxylic acid.

<6> The pretreatment liquid for an impermeable base material according to any one of <1> to <5>, in which the resin particles (C) contain at least one selected from the group consisting of an acrylic resin, an ester resin, and a urethane resin.

<7> The pretreatment liquid for an impermeable base material according to any one of <1> to <6>, in which the aggregating agent (A) contains the organic acid, and a ratio of the number of moles of an acid group of the organic acid to the number of moles of the basic nitrogen atom of the nitrogen-containing compound (B) is 1.3 or greater.

<8> The pretreatment liquid for an impermeable base material according to any one of <1> to <7>, in which a mass content of the resin particles (C) and a mass content of the aggregating agent (A) satisfy a relationship of "mass content of resin particles (C)>mass content of aggregating agent (A)".

<9> The pretreatment liquid for an impermeable base material according to any one of <1> to <8>, in which a mass content of the aggregating agent (A) and a mass content of the nitrogen-containing compound (B) satisfy a relationship of "mass content of aggregating agent (A)>mass content of nitrogen-containing compound (B)".

<10> The pretreatment liquid for an impermeable base material according to any one of <1> to <9>, in which a mass content of the resin particles (C) and a mass content of the nitrogen-containing compound (B) satisfy a relationship of "mass content of resin particles (C)>mass content of nitrogen-containing compound (B)×1.5".

<11> An ink set comprising: the pretreatment liquid for an impermeable base material according to any one of <1> to <10>; and an ink containing a colorant and water.

<12> An image recording method comprising: applying the pretreatment liquid for an impermeable base material according to any one of <1> to <10> onto an impermeable base material to form a film; and applying an ink containing a colorant and water to a part of the film to record an image.

<13> An image recorded material comprising: an impermeable base material; a film disposed on the impermeable base material; and an image disposed on a part of the film and containing a colorant, in which the film contains an aggregating agent (A) containing at least one selected from the group consisting of an organic acid and a polyvalent metal salt, a nitrogen-containing compound (B) containing at least one selected from the group consisting of ammonia, an amine, and a heterocyclic compound that contains a basic nitrogen atom, and a resin.

<14> A method of producing a recording medium, comprising: applying the pretreatment liquid for an impermeable base material according to any one of <1> to <10> onto an impermeable base material to form a film.

<15> A recording medium comprising: an impermeable base material; and a film disposed on the impermeable base material, in which the film contains an aggregating agent (A) containing at least one selected from the group consisting of an organic acid and a polyvalent metal salt, a nitrogen-containing compound (B) containing at least one selected from the group consisting of ammonia, an amine, and a heterocyclic compound that contains a basic nitrogen atom, and a resin.

According to one aspect of the present disclosure, it is possible to provide a pretreatment liquid for an impermeable base material, an ink set, an image recording method, an image recorded material, and a recording medium and a method of producing the same, which enable formation of a film with suppressed stickiness and whitening on an impermeable base material.

DESCRIPTION OF THE PREFERRED EMBODIMENTS

Figure 1:
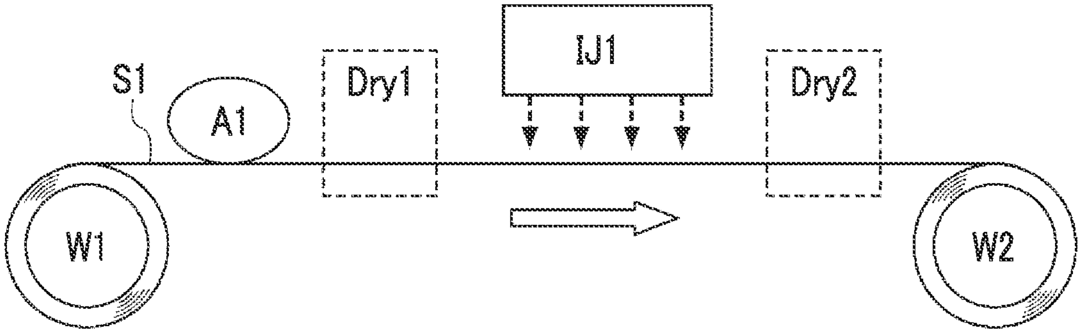
FIG. 1 is a schematic configuration view illustrating an example of an image recording device suitable for performing an image recording method according to an example of the present disclosure.

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, a pretreatment liquid for an impermeable base material indicates a pretreatment liquid to be applied to an impermeable base material.

The pretreatment liquid for an impermeable base material can be applied to an impermeable base material before using an ink, for example, in a case where an image is recorded on the impermeable base material using the ink.

Further, the pretreatment liquid for an impermeable base material can also be used for producing a recording medium comprising a film derived from the pretreatment liquid for an impermeable base material on an impermeable base material. The obtained recording medium is used for applying an ink onto the film of the recording medium to record an image.

In the present disclosure, a film derived from the pretreatment liquid for an impermeable base material indicates a film formed by applying the pretreatment liquid for an impermeable base material onto an impermeable base material.

Hereinafter, the pretreatment liquid for an impermeable base material may also be simply referred to as the "pretreatment liquid". A film derived from the pretreatment liquid for an impermeable base material may also be simply referred to as a "film derived from the pretreatment liquid".

[Pretreatment Liquid for Impermeable Base Material]

The pretreatment liquid of the present disclosure (that is, the pretreatment liquid for an impermeable base material) contains an aggregating agent (A) which contains at least one selected from the group consisting of an organic acid and a polyvalent metal salt, a nitrogen-containing compound (B) which contains at least one selected from the group consisting of ammonia, an amine, and a heterocyclic compound containing a basic nitrogen atom, and resin particles (C), and water.

According to the pretreatment liquid of the present disclosure, a film with suppressed stickiness and whitening can be formed on the impermeable base material as a film derived from the pretreatment liquid.

The reason why such an effect is exhibited is assumed as follows.

An image recording method in an aspect in which in which a pretreatment liquid containing an aggregating agent and a resin is applied to an impermeable base material to form a film and an ink is applied to a part of the formed film to record an image is advantageous from the viewpoints of the image quality and the adhesiveness of the image to be recorded (that is, the adhesiveness of the image to the impermeable base material).

However, as a result of examination conducted by the present inventors, it was found that in a case where a film is formed by applying a pretreatment liquid containing an aggregating agent and a water-soluble resin (for example, the pretreatment liquid described in JP2014-73672A) to an impermeable base material, the film to be formed is sticky in some cases.

The stickiness of the film is considered to be due to the water-soluble resin in the pretreatment liquid. Specifically, in a case where the pretreatment liquid is applied to the impermeable base material, the pretreatment liquid hardly permeates into the impermeable base material and thus remains on the surface of the impermeable base material. Thereafter, the pretreatment liquid remaining on the surface of the impermeable base material is naturally dried or forcibly dried by being heated or the like to form a film. It is considered that in a case where the pretreatment liquid contains a water-soluble resin, the film is sticky due to the remaining of the water-soluble resin in the film.

It is considered that since the pretreatment liquid of the present disclosure contains the resin particles (C), the stickiness of the film due to the water-soluble resin described above is suppressed.

Further, as a result of examination conducted by the present inventors, it was found that in a case where a film is formed by applying a pretreatment liquid containing an aggregating agent to an impermeable base material, the film to be formed is whitened in some cases.

In an aspect in which a pretreatment liquid is applied onto an impermeable base material to form a film and an ink is applied to a part of the formed film to record an image, whitening of the film is easily visually recognized in an image non-recorded region on the film.

Further, in an aspect in which a recording medium is produced by applying a pretreatment liquid onto an impermeable base material to form a film, whitening of the film is easily visually recognized in the entire film.

It was found that whitening of the film is likely to occur in a case where a pretreatment liquid containing an aggregating agent with a high crystallinity (specifically, an organic acid or a polyvalent metal salt) is used as the aggregating agent. The whitening of the film in this case is considered to occur due to formation of crystals containing an aggregating agent in the film formed by applying a pretreatment liquid.

Although the pretreatment liquid of the present disclosure contains the aggregating agent (A) that contains at least one selected from the group consisting of an organic acid and a polyvalent metal salt, which is an aggregating agent with a high crystallinity, the whitening of the film can be suppressed.

The first reason why the effect of suppressing whitening of the film is exhibited is considered to be that the pretreatment liquid of the present disclosure contains the nitrogen-containing compound (B) containing at least one selected from the group consisting of ammonia, an amine, and a heterocyclic compound containing a basic nitrogen atom. Specifically, it is considered that in a case where the pretreatment liquid of the present disclosure is applied onto an impermeable base material to form a film, the nitrogen-containing compound (B) is disposed between molecules of the aggregating agent (A) due to the interaction between the aggregating agent (A) serving as an acidic substance and the nitrogen-containing compound (B) serving as a basic substance in the formed film. In this manner, it is considered that the formation of crystals containing the aggregating agent (A) in the film is suppressed, and thus the whitening of the film is suppressed.

The second reason why the effect of suppressing whitening of the film is exhibited is considered to be that the pretreatment liquid of the present disclosure contains resin particles. Specifically, it is considered that in a case where the pretreatment liquid of the present disclosure is applied onto an impermeable base material, resin particles are disposed between the molecules of the aggregating agent (A), and thus the formation of crystals containing the aggregating agent in the film is suppressed, and as a result, the whitening of the film is suppressed.

In the present disclosure, the term "water-soluble" indicates a property in which 1 g or greater of a substance is dissolved in 100 g of water at 25° C.

As the "water-soluble" property, a property in which 3 g or greater (more preferably 10 g or greater) of a substance is dissolved in 100 g of water at 25° C. is preferable.

<Impermeable Base Material>

As described above, the pretreatment liquid of the present disclosure is a pretreatment liquid to be applied to an impermeable base material.

In the present disclosure, the impermeable base material indicates a base material having a water absorption rate (unit: % by mass, measurement time: 24 hours) of less than 0.2 in ASTM D570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in a shape of a sheet or a film.

As the resin base material, a base material containing polypropylene, polyethylene terephthalate, nylon, polyethylene, or polyimide is preferable.

The resin base material may be a transparent resin base material or a colored resin base material.

Here, the term "transparent" indicates that the transmittance of visible light having a wavelength of 400 nm to 700 nm is 80% or greater (preferably 90% or greater).

The shape of the resin base material is not particularly limited, but a sheet-shaped resin base material is preferable and a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a flame treatment, a heat treatment, an abrasion treatment, and a light irradiation treatment (UV treatment), but the surface treatment is not limited thereto.

<Aggregating Agent (A)>

The pretreatment liquid of the present disclosure contains the aggregating agent (A) that contains at least one selected from the group consisting of an organic acid and a polyvalent metal salt.

The melting point of the aggregating agent (A) is not particularly limited, but is preferably 40° C. or higher, more preferably 60° C. or higher, and still more preferably 80° C. or higher from the viewpoint of further suppressing the stickiness of the film derived from the pretreatment liquid.

The upper limit of the melting point of the aggregating agent (A) is not particularly limited, but the upper limit is, for example, 1000° C.

(Organic acid)

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

The melting point of the organic acid is not particularly limited, but is preferably 40° C. or higher, more preferably 60° C. or higher, and still more preferably 80° C. or higher from the viewpoint of further suppressing the stickiness of the film derived from the pretreatment liquid.

The upper limit of the melting point of the organic acid is not particularly limited, and the upper limit thereof may be, for example, 300° C. or 200° C.

Preferred examples of the organic compound containing a carboxy group include polyacrylic acid, acetic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, 4-methylphthalic acid, lactic acid, pyrrolidone carboxylic acid, pyrrone carboxylic acid, pyrrole carboxylic acid, furan carboxylic acid, pyridine carboxylic acid, coumalic acid, thiophene carboxylic acid, nicotinic acid, and pimelic acid. These compounds may be used alone or in combination of two or more kinds thereof.

From the viewpoint of the aggregation rate of the ink (that is, the image quality of the image to be recorded), a divalent or higher valent carboxylic acid (hereinafter, also referred to as a polyvalent carboxylic acid) is preferable as the organic compound containing a carboxy group.

From the viewpoint of further suppressing the stickiness of the film derived from the pretreatment liquid and from the viewpoint of the image quality of the image to be recorded, as the polyvalent carboxylic acid, a dicarboxylic acid or a tricarboxylic acid is preferable, glutaric acid (melting point of 98° C.), malonic acid (melting point of 134° C.), succinic acid (melting point of 187° C.), adipic acid (melting point of 153° C.), pimelic acid (melting point of 106° C.), malic acid (melting point of 130° C.), maleic acid (melting point of 131° C.), fumaric acid (melting point of 287° C.), tartaric acid (melting point of 199° C.), or citric acid (melting point of 154° C.) is more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the particles into contact with an organic acidic compound having a lower pKa to decrease the dispersion stability.

It is preferable that the organic acid has a low pKa and a high solubility in water and is divalent or higher valent and more preferable that the organic acid is a divalent or trivalent acidic substance which has a high buffering capacity in a pH region lower than the pKa of the functional group (for example, a carboxy group) that allows the particles to be stably dispersed in the ink.

The molecular weight of the organic acid is preferably 1000 or less, more preferably 500 or less, and still more preferably 300 or less.

The lower limit of the molecular weight of the organic acid is, for example, 60, preferably 90 or greater, and more preferably 100 or greater.

(Polyvalent Metal Salt)

Examples of the polyvalent metal salt include salts containing alkaline earth metals of a group 2 (such as magnesium and calcium) in the periodic table, salts containing transition metals of a group 3 (such as lanthanum) in the periodic table, salts containing cations of a group 13 (such as aluminum) in the periodic table, and salts containing lanthanides (such as neodymium).

Suitable examples of the polyvalent metal salt include salts of the above-described organic acids, nitrates, chlorides, and thiocyanates.

Preferred examples of the polyvalent metal salt include a calcium salt or magnesium salt of an organic acid (such as acetic acid or a benzoate), a calcium salt or magnesium salt of nitric acid, calcium chloride, magnesium chloride, and a calcium salt or magnesium salt of thiocyanic acid.

Further, it is preferable that at least a part of the polyvalent metal salt is dissociated into polyvalent metal ions and counter ions in the pretreatment liquid.

The aggregating agent (A) may include other aggregating agents other than the organic acid and the polyvalent metal salt.

Examples of other aggregating agents include a metal complex and a water-soluble cationic polymer.

However, whitening of the film derived from the pretreatment liquid is a phenomenon that significantly occurs particularly in a case of using an organic acid and/or a polyvalent metal salt, which is an aggregating agent with a high crystallinity.

Therefore, from the viewpoint of more effectively obtaining the effect of suppressing the whitening of the film using the nitrogen-containing compound (B), the proportion of the organic acid and the polyvalent metal salt in the aggregating agent (A) is preferably in a range of 50% by mass to 100% by mass, more preferably in a range of 60% by mass to 100% by mass, and still more preferably in a range of 80% by mass to 100% by mass.

From the viewpoint of further suppressing the stickiness of the film derived from the pretreatment liquid and from the viewpoint of the image quality of the image to be recorded, the aggregating agent (A) contains preferably an organic acid and more preferably at least one selected from the group consisting of a dicarboxylic acid and a tricarboxylic acid.

In a case where the aggregating agent (A) contains an organic acid, from the viewpoint of further suppressing the stickiness of the film derived from the pretreatment liquid and from the viewpoint of the image quality of the image to be recorded, the proportion of the organic acid in the entire aggregating agent (A) is preferably in a range of 50% by mass to 100% by mass, more preferably in a range of 60% by mass to 100% by mass, and still more preferably in a range of 80% by mass to 100% by mass.

In a case where the aggregating agent (A) contains at least one selected from the group consisting of a dicarboxylic acid and a tricarboxylic acid, from the viewpoint of further suppressing the stickiness of the film derived from the pretreatment liquid and from the viewpoint of the image quality of the image to be recorded, the total proportion of the dicarboxylic acid and the tricarboxylic acid in the entire aggregating agent (A) is preferably in a range of 50% by mass to 100% by mass, more preferably in a range of 60% by mass to 100% by mass, and still more preferably in a range of 80% by mass to 100% by mass.

The content of the aggregating agent (A) is preferably in a range of 0.1% by mass to 40% by mass, more preferably in a range of 0.1% by mass to 30% by mass, still more preferably in a range of 1% by mass to 20% by mass, and even still more preferably in a range of 1% by mass to 10% by mass with respect to the total amount of the pretreatment liquid.

<Nitrogen-Containing Compound (B)>

The pretreatment liquid of the present disclosure contains a nitrogen-containing compound (B) (that is, a nitrogen-containing compound that contains at least one selected from the group consisting of ammonia, an amine, and a heterocyclic compound containing a basic nitrogen atom).

It is preferable that the nitrogen-containing compound (B) is has a high basicity. That is, it is preferable that the pKb of the nitrogen-containing compound (B) is small. Specifically, the pKb of the nitrogen-containing compound (B) is preferably 6 or less, and more preferably 4 or less.

In the present disclosure, the amine indicates a compound in which the nitrogen atom of ammonia has been substituted with a hydrocarbon group, as usually defined.

The hydrocarbon group may have a substituent such as a hydroxy group.

In the present disclosure, the "basic nitrogen atom" in the "heterocyclic compound having a basic nitrogen atom" indicates a primary nitrogen atom, a secondary nitrogen atom, or a tertiary nitrogen atom.

Here, the primary nitrogen atom indicates a N atom in Structure (1), the secondary nitrogen atom indicates a N atom in Structure (2), and the tertiary nitrogen atom indicates a N atom in Structure (3).

(1)

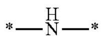
(2)

(3)

In Structure (1), the symbol "*" represents a bonding position with respect to a hydrocarbon group which may have a substituent.

In Structure (2), each of the two symbols "*" represents a bonding position with respect to a hydrocarbon group which may have a substituent.

In Structure (3), each of the three symbols "*" represents a bonding position with respect to a hydrocarbon group which may have a substituent.

Structure (2) and Structure (3) may be a part of a heterocycle.

That is, in the present disclosure, the heterocyclic compound having a basic nitrogen atom has at least one selected from the group consisting of Structure (1), Structure (2), and Structure (3).

As the heterocyclic compound having a basic nitrogen atom, a compound having at least one of Structure (2) or Structure (3) as a part of a heterocycle is more preferable, and a compound having Structure (2) as a part of a heterocycle is still more preferable.

In the present disclosure, the heterocyclic compound having a basic nitrogen atom may be a heteroalicyclic compound having a basic nitrogen atom or a heteroaromatic compound having a basic nitrogen atom.

Examples of the heterocyclic compound as the nitrogen-containing compound (B) include piperidine, pyrrolidine, and imidazole.

From the viewpoint of further suppressing whitening of the film derived from the pretreatment liquid, it is preferable that the nitrogen-containing compound (B) contains an amine.

In this case, the proportion of the amine in the total amount of the nitrogen-containing compound (B) is preferably in a range of 50% by mass to 100% by mass, more preferably in a range of 60% by mass to 100% by mass, and still more preferably in a range of 80% by mass to 100% by mass.

From the viewpoint of further suppressing whitening of the film derived from the pretreatment liquid, an amine having a boiling point of 100° C. or higher is preferable as the amine contained in the nitrogen-containing compound (B).

From the viewpoint of further suppressing whitening of the film derived from the pretreatment liquid and from the viewpoint of the stability of the pretreatment liquid, an amine containing a hydroxy group is preferable as the amine contained in the nitrogen-containing compound (B).

Further, from the viewpoint of the stability of the pretreatment liquid, a secondary amine or a tertiary amine is preferable as the amine contained in the nitrogen-containing compound (B).

The molecular weight of the amine contained in the nitrogen-containing compound (B) is preferably 1000 or less, more preferably 500 or less, and still more preferably 300 or less.

The lower limit of the molecular weight of the amine is, for example, 31 (that is, the molecular weight of methylamine).

As specific examples of the amine contained in the nitrogen-containing compound (B), specific examples of the amine having a boiling point of 100° C. or higher and containing a hydroxy group include monoethanolamine, diethanolamine, triethanolamine, monopropanolamine, dipropanolamine, tripropanolamine, monoisopropanolamine, diisopropanolamine, triisopropanolamine, monobutanolamine, dibutanolamine, tributanolamine, N-methylethanolamine, N-methylpropanolamine, N-methylisopropanolamine, N-methylbutanolamine, N-ethylethanolamine, N-ethylpropanolamine, N-ethylisopropanolamine, N-ethylbutanolamine, N,N-dimethylethanolamine, N,N-dimethylpropanolamine, N,N-dimethylisopropanolamine, N,N-dimethylbutanolamine, N,N-diethylethanolamine, N,N-diethylpropanolamine, N,N-diethylisopropanolamine, N,N-diethylbutanolamine, N,N-bis(2-hydroxyethyl)dodecylamine, N,N-bis(2-hydroxyethyl)octylamine, and N,N-bis(2-hydroxyethyl) isopropanolamine.

As specific examples of the amine contained in the nitrogen-containing compound (B), specific examples of the amine that does not contain a hydroxy group include monoethylamine, diethylamine, triethylamine, monopropylamine, dipropylamine, tripropylamine, and hexamethylenetetramine.

The content of the nitrogen-containing compound (B) is preferably in a range of 0.1% by mass to 5.0% by mass, more preferably in a range of 0.1% by mass to 4.0% by mass, still more preferably in a range of 0.1% by mass to 3.0% by mass, and even still more preferably in a range of 0.1% by mass to 2.0% by mass with respect to the total amount of the pretreatment liquid.

In a case where the content of the nitrogen-containing compound (B) with respect to the total amount of the pretreatment liquid is 0.1% by mass or greater, whitening of the film derived from the pretreatment liquid is further suppressed.

In a case where the content of the nitrogen-containing compound (B) with respect to the total amount of the pretreatment liquid is 5.0% by mass or less, the adhesiveness of the image (that is, the adhesiveness of the image to the impermeable base material, the same applies hereinafter) and the image quality (that is, the image accuracy, the same applies hereinafter) are further improved.

Further, from the viewpoint of further improving the adhesiveness and the image quality of the image, it is preferable that the aggregating agent (A) contains an organic acid, and the ratio of the number of moles of the acid group of the organic acid to the number of moles of the basic nitrogen atom of the nitrogen-containing compound (B) (hereinafter, the molar ratio [acid group of organic acid/basic nitrogen atom of nitrogen-containing compound (B)]) is 1.2 or greater.

From the viewpoint of further improving the adhesiveness and the image quality of the image, the molar ratio [acid group of organic acid/basic nitrogen atom of nitrogen-containing compound (B)] is more preferably 1.3 or greater, still more preferably 1.4 or greater, even still more preferably 1.5 or greater, and even still more preferably 1.9 or greater.

The upper limit of the molar ratio [acid group of organic acid/basic nitrogen atom of nitrogen-containing compound (B)] is not particularly limited. From the viewpoint of further improving the image quality of the image, the molar ratio [acid group of organic acid/basic nitrogen atom of nitrogen-containing compound (B)] is preferably 35 or less, more preferably 30 or less, and still more preferably 25 or less.

Here, the number of moles of the acid group of the organic acid indicates the product of the number of moles of all the organic acids contained in the pretreatment liquid and the valence of the organic acid.

The number of moles of the basic nitrogen atom of the nitrogen-containing compound (B) indicates the total number of moles of the basic nitrogen atoms in all the nitrogen-containing compounds (B) contained in the pretreatment liquid.

Further, the concept of the "basic nitrogen atom of the nitrogen-containing compound (B)" (that is, the basic nitrogen atoms in all the nitrogen-containing compounds (B) contained in the pretreatment liquid) includes not only the basic nitrogen atom in the heterocyclic compound having a basic nitrogen atom, but also the nitrogen atom in the ammonia, the primary nitrogen atom in the amine, the secondary nitrogen atom in the amine, and the tertiary nitrogen atom in the amine.

<Resin Particles (C)>

The pretreatment liquid contains at least one kind of resin particles (C).

In a case where the pretreatment liquid contains the resin particles (C), the adhesiveness of the image to the impermeable base material is ensured.

The resin particles (C) contained in the pretreatment liquid are not particularly limited, and examples thereof include known resin particles.

The glass transition temperature (Tg) of the resin particles (C) contained in the pretreatment liquid is preferably in a range of 0° C. to 120° C., more preferably in a range of 10° C. to 80° C., still more preferably in a range of 15° C. to 60° C., and even still more preferably in a range of 20° C. to 60° C.

In the present disclosure, the glass transition temperature of the resin particles (C) indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin particles are maintained at a temperature lower than the expected glass transition temperature of the resin particles by approximately 50° C. until the device is stabilized, the resin particles are heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

In the present disclosure, in a case where the pretreatment liquid contains two or more kinds of resin particles (C), the glass transition temperature of the resin particles (C) contained in the pretreatment liquid indicates the weighted average value of the glass transition temperatures of individual resin particles (C) contained in the pretreatment liquid.

Here, the weighted average value of the glass transition temperatures of individual resin particles (C) contained in the pretreatment liquid can be acquired by Mathematical Formula 1.

Specifically, the weighted average value of the glass transition temperatures of individual resin particles (C) contained in the pretreatment liquid can be calculated as X in Mathematical Formula 1 by substituting the glass transition temperature of the i-th (i represents an integer of 1 or greater) resin particle (C) contained in the pretreatment liquid for $S_i$ and substituting the mass fraction of the i-th resin particle (C) in the entirety of the resin particles (C) contained in the pretreatment liquid for $W_i$ in Mathematical Formula 1.

$$X = \sum S_i W_i / \sum W_i \quad \text{(Mathematical Formula 1)}$$

Examples of the resin contained in the resin particles (C) include a urethane resin, an amide resin, a urea resin, a polycarbonate resin, an olefin resin, a styrene resin, an ester resin, and an acrylic resin.

The resin particles (C) may contain only one or two or more kinds of resins.

From the viewpoint of further suppressing whitening of the film derived from the pretreatment liquid and from the viewpoint of further improving the adhesiveness of the image to the impermeable base material, it is preferable that the resin particles (C) contain at least one selected from the group consisting of an acrylic resin, an ester resin, and a urethane resin.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

As the resin particles (C), acrylic resin particles, ester resin particles, a mixture of acrylic resin particles and ester resin particles, or composite particles containing an acrylic resin and an ester resin are preferable.

The resin contained in the resin particles (C) has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is more preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin particles (C).

From the viewpoint that water-dispersible resin particles described below are preferably used as the resin particles (C), it is preferable that the resin contained in the resin particles (C) contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, and the ionic group can be preferably used in a case where the amount thereof is set such that the resin particles (C) are water-dispersible resin particles. For example, the amount thereof is preferably in a range of 0.001 mol to 1.0 mol and more preferably in a range of 0.01 mol to 0.5 mol, per 100 g of the resin contained in the resin particles (C).

The weight-average molecular weight (Mw) of the resin in the resin particles (C) is preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

It is preferable that the resin particles (C) are water-dispersible resin particles.

In the present disclosure, the water dispersibility indicates a property in which precipitation is not confirmed even after a substance is stirred in water at 20° C. and the solution is allowed to stand at 20° C. for 60 minutes.

The volume average particle diameter of the resin particles (C) is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer.

As a measuring device, a particle size distribution measuring device "MICROTRAC MT-3300II" (manufactured by Nikkiso Co., Ltd.) is exemplified.

Further, in the present disclosure, in a case where the pretreatment liquid contains two or more kinds of resin particles (C), the volume average particle diameter (Pp) of the resin particles (C) contained in the pretreatment liquid indicates the weighted average value of the volume average particle diameters (nm) of individual resin particles (C) contained in the pretreatment liquid.

Here, the weighted average value of the volume average particle diameters (nm) of individual resin particles (C) contained in the pretreatment liquid can be acquired according to Mathematical Formula 1 described above.

Specifically, in Mathematical Formula 1 described above, the weighted average value of the volume average particle diameters (nm) of individual resin particles (C) contained in the pretreatment liquid can be calculated as X in Mathematical Formula 1 by substituting the volume average particle diameter (nm) of the i-th (i represents an integer of 1 or greater) resin particle (C) contained in the pretreatment liquid for $S_i$ and substituting the mass fraction of the i-th resin particle (C) in the entirety of the resin particles (C) contained in the pretreatment liquid for $W_i$.

In a case of preparing the pretreatment liquid, a commercially available product of an aqueous dispersion liquid of the resin particles (C) may be used.

Examples of the commercially available product of the aqueous dispersion liquid of the resin particles (C) include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLAS COAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

The content of the resin particles (C) is not particularly limited.

The content of the resin particles (C) is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

It is preferable that the mass content of the resin particles (C) and the mass content of the aggregating agent (A) in the pretreatment liquid of the present disclosure satisfy the relationship of "mass content of resin particles (C)>mass content of aggregating agent (A)".

In other words, the ratio of the mass content of the resin particles (C) to the mass content of the aggregating agent (A) (hereinafter, also referred to as an amount ratio [C/A]) is preferably greater than 1. In this manner, whitening of the film derived from the pretreatment liquid is further suppressed, and the adhesiveness of the image is further improved.

The amount ratio [C/A] is preferably greater than 1 and 4 or less, more preferably 1.1 or greater and 3 or less, and still more preferably 1.5 or greater and 3 or less.

It is preferable that the mass content of the aggregating agent (A) and the mass content of the nitrogen-containing compound (B) in the pretreatment liquid of the present disclosure satisfy the relationship of "mass content of aggregating agent (A)>mass content of nitrogen-containing compound (B)". In other words, the ratio of the mass content of the aggregating agent (A) to the mass content of the nitrogen-containing compound (B) (hereinafter, also referred to as an amount ratio [A/B]) is preferably greater than 1. In this manner, the stability of the pretreatment liquid is further improved, and the image quality of the image is further improved.

The amount ratio [A/B] is preferably greater than 1 and 20 or less, more preferably 1.5 or greater and 15 or less, and still more preferably 5 or greater and 15 or less.

It is preferable that the mass content of the resin particles (C) and the mass content of the nitrogen-containing compound (B) in the pretreatment liquid of the present disclosure satisfy the relationship of "mass content of resin particles (C)>mass content of nitrogen-containing compound (B)×1.5". In other words, the ratio of the mass content of the resin particles (C) to the mass content of the nitrogen-containing compound (B) (hereinafter, also referred to as an amount ratio [C/B]) is preferably greater than 1.5. In this manner, the stickiness of the film derived from the pretreatment liquid is further suppressed, and the stability of the pretreatment liquid is further improved.

The amount ratio [C/B] is preferably greater than 1.5 and 40 or less, more preferably 5 or greater and 40 or less, still more preferably 5 or greater and 30 or less, and even still more preferably 5 or greater and 20 or less.

<Water>

The pretreatment liquid of the present disclosure contains water.

The content of water is preferably 50% by mass or greater and more preferably 60% by mass or greater with respect to the total amount of the pretreatment liquid.

The upper limit of the content of water depends on the amount of other components, but is preferably 90% by mass or less and more preferably 80% by mass or less with respect to the total amount of the pretreatment liquid.

<Water-Soluble Solvent>

It is preferable that the pretreatment liquid of the present disclosure contains at least one water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and alkyl alcohols having 1 to 4 carbon atoms, glycol ethers, 2-pyrrolidone, and N-methyl-2-pyrrolidone described in paragraph 0116 of JP2011-42150A.

Among these, from the viewpoint of suppressing transfer of components, polyhydric alcohol or polyhydric alcohol ether is preferable, and alkanediol, polyalkylene glycol, or polyalkylene glycol ether is more preferable.

(Surfactant)

The pretreatment liquid of the present disclosure may contain at least one surfactant.

The surfactant can be used as a surface tension adjuster or an antifoaming agent. Examples of the surface tension adjuster or the antifoaming agent include a nonionic surfactant, a cationic surfactant, an anionic surfactant, and a betaine surfactant. Among these, from the viewpoint of the aggregation rate of the ink, a nonionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989).

Further, other examples of the surfactant include fluorine-based (fluorinated alkyl-based) surfactants and silicone-based surfactants described in JP2003-322926A, JP2004-325707A, and JP2004-309806A.

In a case where the pretreatment liquid of the present disclosure contains a surfactant, the content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

For example, in a case where the pretreatment liquid contains a surfactant as an antifoaming agent, the content of the surfactant as an antifoaming agent is preferably in a range of 0.0001% by mass to 1% by mass and more preferably in a range of 0.001% by mass to 0.10% by mass with respect to the total amount of the pretreatment liquid.

(Other Components)

The pretreatment liquid of the present disclosure may contain other components in addition to the above-described components as necessary.

Examples of other components that may be contained in the pretreatment liquid include known additives such as a solid wetting agent, colloidal silica, an inorganic salt, a discoloration inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(Physical Properties of Pretreatment Liquid)

The pH of the pretreatment liquid of the present disclosure at 25° C. is preferably in a range of 0.5 to 6.0.

In a case where the pH of the pretreatment liquid at 25° C. is 0.5 or greater, the roughness of the impermeable base material is further decreased and the adhesiveness of the image area is further improved.

In a case where the pH of the pretreatment liquid at 25° C. is 6.0 or less, the aggregation rate is further improved, coalescence of dots (ink dots) due to the ink on the impermeable base material is further suppressed, and the roughness of the image is further decreased.

The pH of the pretreatment liquid at 25° C. is more preferably in a range of 0.5 to 5.0.

The pH in the present disclosure indicates a value measured using a pH meter.

From the viewpoint of the aggregation rate of the ink, the viscosity of the pretreatment liquid of the present disclosure is preferably in a range of 0.5 mPa·s to 10 mPa·s and more preferably in a range of 1 mPa·s to 5 mPa·s.

The viscosity in the present disclosure is a value measured at 25° C. using a viscometer.

As the viscometer, for example, a VISCOMETER TV-22 type viscometer (manufactured by Toki Sangyo Co., Ltd.) can be used.

The surface tension of the pretreatment liquid of the present disclosure is preferably 60 mN/m or less, more preferably in a range of 20 mN/m to 50 mN/m, and still more preferably in a range of 30 mN/m to 45 mN/m.

In a case where the surface tension of the pretreatment liquid is in the above-described range, the adhesiveness between the impermeable base material and the pretreatment liquid is improved.

The surface tension in the present disclosure is a value measured at a temperature of 25° C.

The surface tension can be measured using, for example, an Automatic Surface Tensiometer CBVP-Z (manufactured by Kyowa Interface Science Co., Ltd.).

[Ink Set]

An ink set of the present disclosure comprises the above-described pretreatment liquid of the present disclosure and an ink containing a colorant and water.

The ink set of the present disclosure is suitably used for image recording (for example, an image recording method of the present disclosure described below) in an aspect in which an image is recorded by applying the pretreatment liquid of the present disclosure onto an impermeable base material and applying an ink to a part of a region where the pretreatment liquid has been applied onto the impermeable base material.

Since the ink set of the present disclosure comprises the pretreatment liquid of the present disclosure described above, the ink set of the present disclosure exhibits the same effects as those of the pretreatment liquid of the present disclosure described above. In particular, in the image non-recorded region in the region where the pretreatment liquid has been applied onto the impermeable base material, whitening and stickiness of the film derived from the pretreatment liquid are suppressed.

<Pretreatment Liquid>

The ink set of the present disclosure comprises the above-described pretreatment liquid of the present disclosure.

Further, the ink set of the present disclosure may comprise only one or two or more kinds of the above-described pretreatment liquids of the present disclosure.

<Ink>

The ink set of the present disclosure comprises an ink containing a colorant and water.

The ink set of the present disclosure may comprise only one or two or more kinds of above-described inks.

According to an aspect in which the ink set of the present disclosure comprises two or more kinds of the above-described inks, a multicolor image can be recorded.

Examples of two or more kinds of the inks include three kinds of inks consisting of a cyan ink, a magenta ink, and a yellow ink; four kinds of inks consisting of a cyan ink, a magenta ink, a yellow ink, and a black ink; four or more kinds of inks consisting of the above-described three kinds of colored inks and at least one selected from a white ink, a green ink, an orange ink, a violet ink, a light cyan ink, a light magenta ink, and a light yellow ink; and five or more kinds of inks consisting of the above-described four kinds of colored inks and at least one selected from a white ink, a green ink, an orange ink, a violet ink, a light cyan ink, a light magenta ink, and a light yellow ink.

However, two or more kinds of inks are not limited to these specific examples.

From the viewpoint of the image quality and the like of the image to be recorded, an inkjet ink is preferable as the ink.

Hereinafter, each component that can be contained in the ink will be described.

(Colorant)

The ink contains at least one colorant.

The colorant is not particularly limited and known colorants can be used. Among known colorants, an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant used for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

(Water)

The ink contains water.

The content of water is preferably 50% by mass or greater and more preferably 60% by mass or greater with respect to the total amount of the ink.

The upper limit of the content of water depends on the amount of other components, but is preferably 90% by mass or less and more preferably 80% by mass or less with respect to the total amount of the ink.

(Resin Particles)

It is preferable that the ink contains resin particles.

In this manner, the adhesiveness and the image quality of the image are further improved.

From the viewpoint of further improving the adhesiveness and the image quality of the image, at least one of acrylic resin particles or urethane resin particles are preferable as the resin particles.

The meanings of the acrylic resin particles and the urethane resin particles that can be contained in the ink are the same as the meanings of the acrylic resin particles and the urethane resin particles that can be contained in the pretreatment liquid described above.

From the viewpoint of further improving the adhesiveness of the image, it is preferable that the resin particles which can be contained in the ink include acrylic resin particles.

As the acrylic resin particles, acrylic resin particles which are self-dispersing resin particles are also preferable.

Examples of the self-dispersing resin particles include self-dispersing polymer particles described in paragraphs 0062 to 0076 of JP2016-188345A.

In a case where the resin particles which can be contained in the ink include acrylic resin particles, the proportion of the acrylic resin particles in the resin particles which can be contained in the ink is preferably 60% by mass or greater, more preferably 80% by mass or greater, and still more preferably 90% by mass or greater.

In a case where the proportion of the acrylic resin particles in the resin particles which can be contained in the ink is 60% by mass or greater, the adhesiveness of the image is further improved.

The glass transition temperature of the resin particles which can be contained in the ink is not particularly limited, but is preferably 150° C. or lower and more preferably 130° C. or lower from the viewpoint of the manufacturing suitability of the resin particles.

The lower limit of the glass transition temperature of the resin particles which can be contained in the ink is not particularly limited, but is, for example, 50° C. and preferably 80° C.

The method of measuring the glass transition temperature is as described above.

Further, it is preferable that the resin in the resin particles which can be contained in the ink is a water-insoluble resin.

Further, the volume average particle diameter ($P_i$) of the resin particles which can be contained in the ink is preferably in a range of 1 nm to 200 nm, more preferably in a range of 3 nm to 200 nm, and still more preferably in a range of 5 nm to 50 nm.

The method of measuring the volume average particle diameter of the resin particles is as described above.

The weight-average molecular weights (Mw) of respective resins in the resin particles which can be contained in the ink are respectively preferably in a range of 1000 to 300000, more preferably in a range of 2000 to 200000, and still more preferably in a range of 5000 to 100000.

The method of measuring the Mw is as described above.

The resin in the resin particles which can be contained in the ink has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is more preferable.

As the aromatic ring structure, a naphthalene ring or a benzene ring is preferable, and a benzene ring is more preferable.

The amount of the alicyclic structure or the aromatic ring structure is not particularly limited, but is, for example, preferably in a range of 0.01 mol to 1.5 mol and more preferably in a range of 0.1 mol to 1 mol per 100 g of the resin.

It is preferable that the resin in the resin particles which can be contained in the ink contains an anionic group in the structure.

The anionic group is not particularly limited, but a carboxy group or a sulfo group is preferable, and a sulfo group is more preferable.

The amount of the anionic group is not particularly limited, but is preferably in a range of 0.001 mol to 1.0 mol and more preferably in a range of 0.01 mol to 0.5 mol per 100 g of the resin.

The content of the resin particles is preferably in a range of 1% by mass to 25% by mass, more preferably in a range of 2% by mass to 20% by mass, and still more preferably in a range of 3% by mass to 15% by mass with respect to the total amount of the ink.

(Water-Soluble Solvent)

It is preferable that the ink contains at least one water-soluble solvent.

In this manner, the effect of suppressing drying of the ink or the effect of wetting the ink can be obtained.

The water-soluble solvent which may be contained in the ink can be used, for example, as an anti-drying agent that prevents clogging due to aggregates formed by the ink being attached to an ink Jetting port of an ejection nozzle and being dried.

From the viewpoints of wetting and suppressing drying of the ink, a water-soluble solvent having a lower vapor pressure than that of water is preferable as the water-soluble solvent contained in the ink.

In addition, the boiling point of the water-soluble solvent at 1 atm (1013.25 hPa) is preferably in a range of 80° C. to 300° C. and more preferably in a range of 120° C. to 250° C.

As the anti-drying agent, a water-soluble solvent which has a lower vapor pressure than that of water is preferable.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% by mass to 50% by mass with respect to the total amount of the ink.

The water-soluble solvent may be used for adjusting the viscosity of the ink in addition to other purposes described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof.

(Other Additives)

The ink may contain components other than the components described above.

Examples of other components include known additives such as a discoloration inhibitor, an emulsification stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

(Preferable Physical Properties of Ink)

The viscosity of the ink is preferably 1.2 mPa·s or greater and 15.0 mPa·s or less, more preferably 2 mPa·s or greater and less than 13 mPa·s, and still more preferably 2.5 mPa·s or greater and less than 10 mPa·s.

The method of measuring the viscosity is as described above.

The surface tension of the ink is preferably 25 mN/m or greater and 40 mN/m or less and more preferably 27 mN/m or greater and 37 mN/m or less.

The method of measuring the surface tension is as described above.

From the viewpoint of the dispersion stability, the pH of the ink of the present disclosure at 25° C. is preferably in a range of 6 to 11, more preferably in a range of 7 to 10, and still more preferably in a range of 7 to 9.

The method of measuring the pH is as described above.

[Image Recording Method]

An image recording method of the present disclosure includes a step of applying the pretreatment liquid of the present disclosure onto an impermeable base material, and a step of applying an ink containing a colorant and water to a part of a region where the pretreatment liquid has been applied onto the impermeable base material to record an image.

The image recording method of the present disclosure may include other steps as necessary.

In the image recording method of the present disclosure, the pretreatment liquid of the present disclosure is used.

Therefore, the image recording method of the present disclosure exhibits the same effects as those of the pretreatment liquid of the present disclosure.

In particular, in the image non-recorded region in the region where the pretreatment liquid has been applied onto the impermeable base material, whitening and stickiness of the film derived from the pretreatment liquid are suppressed.

<Step of Applying Pretreatment Liquid>

The step of applying the pretreatment liquid is a step of applying the pretreatment liquid onto the surface of the impermeable base material.

The application of the pretreatment liquid onto the impermeable base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reverse roll coater, a gravure coater, or a flexo coater.

The details of the ink jet method are the same as the details of the ink jet method which can be applied to the step of applying the ink described below.

The mass ($g/m^2$) of the pretreatment liquid to be applied per unit area is not particularly limited as long as the components in the ink can be aggregated, but is preferably in a range of 0.1 $g/m^2$ to 10 $g/m^2$, more preferably in a range of 0.5 $g/m^2$ to 6.0 $g/m^2$, and still more preferably in a range of 1.0 $g/m^2$ to 4.0 $g/m^2$.

Further, in the step of applying the pretreatment liquid, the impermeable base material may be heated before the application of the pretreatment liquid.

The heating temperature may be appropriately set according to the type of the impermeable base material and the composition of the pretreatment liquid, but the temperature of the impermeable base material is set to be preferably in a range of 20° C. to 50° C. and more preferably in a range of 25° C. to 40° C.

In the step of applying the pretreatment liquid, the pretreatment liquid may be heated and dried after the application of the pretreatment liquid and before the step of applying the ink described below.

Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher.

The upper limit of the heating temperature is not particularly limited. For example, the upper limit thereof may be 100° C., and is preferably 90° C. and more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Step of Recording Image>

The step of recording an image is a step of applying an ink containing a colorant and water to a part of the region where the pretreatment liquid has been applied onto the impermeable base material to record the image.

The ink can be selectively applied onto the impermeable base material by performing the above-described step. In this manner, a desired image (specifically, a visible image) can be recorded.

In the step of applying the ink, only one or two or more kinds of inks may be applied to a part of the region where the pretreatment liquid has been applied onto the impermeable base material. In a case where inks of two or more colors are applied in the step of applying the ink, images with two or more colors can be recorded.

As the method of applying the ink in the step of applying the ink, a known method such as a coating method, an ink jet method, or an immersion method can be applied.

Among these, an ink jet method is preferable.

The method of jetting the ink in the ink jet method is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and utilizing the generated pressure may be used.

As the ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as the ink jet method, the method described in paragraphs 0093 to 0105 of JP2003-306623A can also be employed.

The application of the ink, according to the ink jet method, to the region where the pretreatment liquid has been applied onto the impermeable base material is performed by jetting the ink from a nozzle of an ink jet head.

Examples of the system of the ink jet head include a shuttle system of performing recording while scanning a short serial head in the width direction of the impermeable base material and a line system of using a line head in which recording elements are aligned in correspondence with the entire area of one side of the impermeable base material.

In the line system, image recording can be performed on the entire surface of the impermeable base material by scanning the impermeable base material in a direction intersecting the direction in which the recording elements are aligned. In the line system, a transport system such as a carriage that scans a short head in the shuttle system is not necessary. Further, in the line system, since movement of a carriage and complicated scanning control between the head and the impermeable base material are not necessary as compared with the shuttle system, only the impermeable base material moves. Therefore, according to the line system, image recording at a higher speed than that of the shuttle system can be realized.

From the viewpoint of obtaining a high-definition image, the liquid droplet amount of the ink to be jetted from the nozzle of the ink jet head is preferably in a range of 1 pico liter (pL) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

In the step of applying the ink, the applied ink may be heated and dried.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher.

The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, in the step of applying the ink, the impermeable base material (specifically, the impermeable base material to which the pretreatment liquid has been applied in the step of applying the pretreatment liquid) may be heated before the application of the ink.

The heating temperature may be appropriately set according to the type of the impermeable base material and/or the composition of the ink, but the temperature of the impermeable base material is set to be preferably in a range of 20° C. to 50° C. and more preferably in a range of 25° C. to 40° C.

Further, in a case where the pretreatment liquid is heated and dried in the step of applying the pretreatment liquid, the heating for heating and drying the pretreatment liquid may also serve as the heating of the impermeable base material before the application of the ink.

The image recording method of the present disclosure may include other steps as necessary.

Examples of other steps include a step of forming an overcoat layer covering the region where the pretreatment liquid has been applied and the image recorded on a part of the region and a step of laminating a laminate base material on a side of the impermeable base material, on which the image has been recorded, where the image is provided.

[One Example of Image Recording Device]

Hereinafter, an example of an image recording device which can be suitably used for the image recording method of the present disclosure will be described with reference to FIG. 1.

FIG. 1 is a view conceptually illustrating an example of the image recording device.

As illustrated in FIG. 1, the image recording device according to the present example is a device which unwinds a long impermeable base material S1 wound in a roll shape by an unwinding device W1, transports the unwound impermeable base material S1 in the direction indicated by the block arrow, allows the impermeable base material to pass through a pretreatment liquid applying device A1, a pretreatment liquid drying zone Dry1, an ink applying device IJ1, and an ink drying zone Dry2 in this order, and finally winds the impermeable base material using a winding device W2.

In addition, since FIG. 1 is a conceptual view, the view is illustrated such that the impermeable base material S1 is transported in one direction by simplifying the transport path of the impermeable base material S1. Practically, it goes without saying that the transport path of the impermeable base material S1 may meander. The method of transporting the impermeable base material S1 can be appropriately selected from various web transport methods of using a drum, a roller, and the like.

The step of applying the pretreatment liquid in the image recording method according to the above-described example is performed using the pretreatment liquid applying device A1 and the pretreatment liquid drying zone Dry1. The pretreatment liquid drying zone Dry1 may be omitted.

The method and the conditions exemplified in the section of the "image recording method" can be employed as the method and the conditions for applying the pretreatment liquid using the pretreatment liquid applying device A1.

The method and the conditions exemplified in the section of the "image recording method" can be employed as the method and the conditions for drying the pretreatment liquid in the pretreatment liquid drying zone Dry1.

Further, a surface treatment unit (not illustrated) for performing a surface treatment (preferably, a corona treatment) on the impermeable base material S1 may be provided on the upstream side of the impermeable base material S1 in the transport direction with respect to the pretreatment liquid applying device A1.

The step of applying the above-described ink is performed using the ink applying device IJ1 and the ink drying zone Dry2. The ink drying zone Dry2 may be omitted.

The method and the conditions exemplified in the section of the step of applying the ink can be employed as the method and the conditions for applying the ink using the ink applying device IJ1.

The method and the conditions exemplified in the section of the step of applying the ink can be employed as the method and the conditions for drying the ink in the ink drying zone Dry2.

Although not illustrated, the structure of the ink applying device IJ1 may be a structure comprising at least one ink jet head.

The ink jet head may be a shuttle head, but a line head in which a large number of jetting ports (nozzles) are aligned in the width direction of a long impermeable base material is preferable as the ink jet head from the viewpoint of speeding up of image recording.

From the viewpoint of speeding up of image recording, it is preferable that the structure of the ink applying device IJ1 is a structure comprising at least one of a line head for black (K) ink, a line head for cyan (C) ink, a line head for magenta (M) ink, or a line head for yellow (Y) ink.

As the structure of the ink applying device IJ1, a structure which comprises at least two of the above-described four line heads and in which two or more of these line heads are aligned in the transport direction of the impermeable base material (the direction indicated by the block arrow) is more preferable.

The ink applying device IJ1 may further comprise at least one of a line head for white ink, a line head for orange ink, a line head for green ink, a line head for purple ink, a line head for light cyan ink, or a line head for light magenta ink.

As described above, in the image recording device according to the present example, an image can be recorded by unwinding the long impermeable base material S1 wound in a roll shape using the unwinding device $W_i$, transporting the unwound impermeable base material S1 in the direction indicated by the block arrow, applying and drying the pretreatment liquid using the pretreatment liquid applying device A1 and the pretreatment liquid drying zone Dry1, and applying and drying the ink using the ink applying device IJ1 and the ink drying zone Dry2.

The impermeable base material S1 (that is, the image recorded material) on which the image has been recorded is wound by the winding device W2.

[Image Recorded Material]

An image recorded material of the present disclosure comprises an impermeable base material, a film disposed on the impermeable base material, and an image disposed on a part of the film and containing a colorant.

The film contains an aggregating agent (A) which contains at least one selected from the group consisting of an organic acid and a polyvalent metal salt, a nitrogen-containing compound (B) which contains at least one selected from the group consisting of ammonia, an amine, and a heterocyclic compound containing a basic nitrogen atom, and a resin.

Since the film disposed on the impermeable base material contains the aggregating agent (A) and the nitrogen-containing compound (B), the image recorded material of the present disclosure exhibits the same effects as those of the pretreatment liquid of the present disclosure.

In particular, whitening and stickiness of the film in the image non-recorded region are suppressed.

The image recorded material of the present disclosure is suitably produced by the image recording method of the present disclosure described above.

Specifically, the film disposed on the impermeable base material is formed by applying the pretreatment liquid of the present disclosure onto the impermeable base material. In this case, the aggregating agent (A) and the nitrogen-containing compound (B) in the pretreatment liquid of the present disclosure remain in the film, and the resin particles (C) in the pretreatment liquid of the present disclosure remain as a resin. The resin particles (C) in the pretreatment liquid of the present disclosure may remain in the film in the form of the resin particles or remain in the film in the form of the resin particles being fused to each other by being heated. It is preferable that the water in the pretreatment liquid of the present disclosure and the water-soluble solvent that can be contained therein as necessary are removed from the film by being dried, but the water and a part of the water-soluble solvent that can be contained therein as necessary may remain in the film.

The image disposed on a part of the film and containing a colorant is formed by applying the ink described in the section of the image recording step to apart of the region where the pretreatment liquid has been applied onto the impermeable base material. In this case, the colorant in the ink of the present disclosure remains in the above-described image. It is preferable that the water in the ink of the present disclosure and the water-soluble solvent that can be contained therein as necessary are removed from the image by being dried, but the water and a part of the water-soluble solvent that can be contained therein as necessary may remain in the image.

The aggregating agent (A) and the nitrogen-containing compound (B) contained in the film are as described in the section of the pretreatment liquid described above, and the preferred aspects are also the same as described above.

The preferred aspects of the resin contained in the film are the same as the preferred aspects of the resin in the resin particles (C) described in the section of the pretreatment liquid described above.

The film may contain components that can be contained in the pretreatment liquid as described in the section of the pretreatment liquid described above, as necessary.

The preferred aspects of the colorant contained in the image are the same as the preferred aspects of the colorant in the ink described in the section of the ink set.

The image may contain components that can be contained in the ink as described in the section of the ink set, as necessary.

In the image recorded material, the interface between the image (that is, the image derived from the ink) and the film (that is, the film derived from the pretreatment liquid) does not necessarily have to be clear. For example, there may be a region between the image and the film, in which components of the ink and components of the pretreatment liquid are mixed.

The image recorded material may comprise elements other than the film and the image, as necessary.

Examples of other elements include an overcoat layer disposed to cover the film and the image and a laminate base material laminated to cover the film and the image.

[Method of Producing Recording Medium]

A method of producing a recording medium of the present disclosure includes a step of applying the pretreatment liquid of the present disclosure onto an impermeable base material.

The method of producing a recording medium of the present disclosure may include other steps, as necessary.

In the method of producing a recording medium of the present disclosure, the pretreatment liquid of the present disclosure is used.

Therefore, the method of producing a recording medium of the present disclosure exhibits the same effects as those of the pretreatment liquid of the present disclosure.

That is, whitening and stickiness of the film derived from the pretreatment liquid are suppressed.

The preferred aspects of the step of applying the pretreatment liquid in the method of producing a recording medium of the present disclosure are the same as the preferred aspects of the step of applying the pretreatment liquid in the image recording method of the present disclosure.

The preferred aspects of the method of producing a recording medium of the present disclosure are aspects in which the step of recording an image is omitted from the image recording method of the present disclosure (for example, aspects of the image recording method of the present disclosure before the step of recording an image).

The method of producing the recording medium of the present disclosure can be performed using, for example, the image recording device (see FIG. 1) according to the above-described example.

In this case, for example, the long impermeable base material S1 wound in a roll shape is unwound using the unwinding device W1, the unwound impermeable base material S1 is transported in the direction indicated by the block arrow, the pretreatment liquid is applied and dried using the pretreatment liquid applying device A1 and the pretreatment liquid drying zone Dry1, and the impermeable base material S1 (that is, the recording medium) that has been coated with the pretreatment liquid and dried is wound by the winding device W2 without applying and drying the ink using the ink applying device IJ1 and the ink drying zone Dry2.

Further, the method of producing a recording medium of the present disclosure can also be performed using a recording medium producing device having a structure in which the ink applying device IJ1 and the ink drying zone Dry2 in the structure of the image recording device (see FIG. 1) according to the above-described example are omitted.

[Recording Medium]

The recording medium of the present disclosure comprises an impermeable base material and a film disposed on the impermeable base material.

The film contains an aggregating agent (A) which contains at least one selected from the group consisting of an organic acid and a polyvalent metal salt, a nitrogen-containing compound (B) which contains at least one selected from the group consisting of ammonia, an amine, and a heterocyclic compound containing a basic nitrogen atom, and a resin.

Since the film disposed on the impermeable base material contains the aggregating agent (A) and the nitrogen-containing compound (B), the recording medium of the present disclosure exhibits the same effects as those of the pretreatment liquid of the present disclosure.

That is, whitening and stickiness of the film derived from the pretreatment liquid are suppressed.

The recording medium of the present disclosure is suitably produced by the above-described method of producing a recording medium of the present disclosure.

Specifically, the film disposed on the impermeable base material is formed by applying the pretreatment liquid of the present disclosure onto the impermeable base material. In this case, the aggregating agent (A) and the nitrogen-containing compound (B) in the pretreatment liquid of the present disclosure remain in the film, and the resin particles (C) in the pretreatment liquid of the present disclosure remain as a resin. The resin particles (C) in the pretreatment liquid of the present disclosure may remain in the film in the form of the resin particles or remain in the film in the form of the resin particles being fused to each other by being heated. It is preferable that the water in the pretreatment liquid of the present disclosure and the water-soluble solvent that can be contained therein as necessary are removed from the film by being dried, but the water and a part of the water-soluble solvent that can be contained therein as necessary may remain in the film.

The aggregating agent (A) and the nitrogen-containing compound (B) contained in the film are as described in the section of the pretreatment liquid described above, and the preferred aspects are also the same as described above.

The preferred aspects of the resin contained in the film are the same as the preferred aspects of the resin in the resin particles (C) described in the section of the pretreatment liquid described above.

The film may contain components that can be contained in the pretreatment liquid as described in the section of the pretreatment liquid described above, as necessary.

The preferred aspects of the film in the recording medium of the present disclosure are the same as the preferred aspects of the film in the image recorded material of the present disclosure.

The preferred aspects of the recording medium of the present disclosure are aspects in which the image is omitted from the image recorded material of the present disclosure.

The image recorded material of the present disclosure can be produced by applying the above-described ink to a part of the film of the recording medium of the present disclosure to record an image.

EXAMPLES

Hereinafter, examples of the present disclosure will be described below, but the present disclosure is not limited to the following examples.

Hereinafter, "parts" and "%" are on a mass basis unless otherwise specified.

Further, in the description below, "water" indicates ion exchange water unless otherwise specified.

Example 1

<Preparation of Pretreatment Liquid>

A pretreatment liquid having the following composition was prepared.

—Composition of Pretreatment Liquid—

- Malonic acid (manufactured by Fujifilm Wako Pure Chemical Corporation; aggregating agent (A)) . . . 4% by mass
- Triisopropanolamine (TIPA) (manufactured by Fujifilm Wako Pure Chemical Corporation; nitrogen-containing compound (B)) . . . 0.5% by mass
- Acrylic resin particles A1 shown below (resin particles (C)) . . . 8% by mass as amount of resin particles
- 1,2-Propanediol (manufactured by Fujifilm Wako Pure Chemical Corporation) . . . 10% by mass
- Antifoaming agent (TSA-739 (15% by mass), manufactured by Momentive Performance Materials Japan LLC, emulsion type silicone antifoaming agent) . . . 0.01% by mass as solid content of antifoaming agent
- Water . . . remaining amount set such that total amount of composition was 100% by mass In the preparation of the pretreatment liquid, the pretreatment liquid was allowed to contain 8% by mass of acrylic resin particles A1 in terms of the amount of the resin particles (C) using an aqueous dispersion of the acrylic resin particles A1.

The aqueous dispersion of the acrylic resin particles A1 was prepared in the following manner.

3.0 g of sodium dodecyl benzene sulfonate (62 mass % aqueous solution, manufactured by Tokyo Chemical Industry Co., Ltd.) and 376 g of water were added to a 1000 mL three-neck flask provided with a stirrer and a cooling pipe, and the solution was heated to 90° C. in a nitrogen atmosphere. A solution A obtained by dissolving 11.0 g of a 50 mass % aqueous solution of sodium 2-acrylamido-2-methylpropane sulfonate (manufactured by Sigma-Aldrich Co., LLC) in 20 g of water, a solution B obtained by mixing 12.5 g of 2-hydroxyethyl methacrylate (manufactured by Fujifilm Wako Pure Chemical Corporation), 5.0 g of 2-(2-ethoxyethoxy)ethyl acrylate (manufactured by Tokyo Chemical Industry Co., Ltd.), 17.0 g of benzyl acrylate (manufactured by Tokyo Chemical Industry Co., Ltd.), and 10.0 g of styrene (St, manufactured by Fujifilm Wako Pure Chemical Corporation), and a solution C obtained by dissolving 6.0 g of sodium persulfate (manufactured by Fujifilm Wako Pure Chemical Corporation) in 40 g of water were simultaneously added dropwise to the heated mixed solution in the three-neck flask for 3 hours. After completion of the dropwise addition, the solution was allowed to further react for 3 hours, thereby obtaining 500 g of an aqueous dispersion liquid of the acrylic resin particles A1 (the amount of solid content (that is, the amount of the acrylic resin particles A1): 10.1% by mass).

The glass transition temperature of the acrylic resin particles A1 was 26° C. Further, the weight-average molecular weight of the acrylic resin particles A1 was 69000.

<Preparation of Cyan Ink>

A cyan ink with the following composition was prepared.

—Composition of Cyan Ink—

- Projet Cyan APD1000 (manufactured by FUJIFILM Imaging Colorants Inc., cyan pigment dispersion liquid, pigment concentration: 12% by mass) . . . 2.4% by mass as amount of solid content
- 1,2-Propanediol (manufactured by Fujifilm Wako Pure Chemical Corporation) (water-soluble solvent) . . . 20% by mass
- OLFINE E1010 (manufactured by Nissin Chemical Co., Ltd.) (surfactant) . . . 1% by mass
- Acrylic resin particles IA-1 shown below (resin particles) . . . 8% by mass as amount of resin particles
- SNOWTEX (registered trademark) XS (manufactured by Nissan Chemical Co., Ltd., colloidal silica) . . . 0.06% by mass as amount of solid content of silica
- Water . . . remaining amount set such that total amount of composition was 100% by mass (Preparation of Aqueous Dispersion Liquid of Acrylic Resin Particles IA-1)

The acrylic resin particles IA-1 in the composition of the cyan ink were produced in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Fujifilm Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one with respect to the solid content of the polymer) of PROXEL GXL (S) (manufactured by Arch Chemicals, Inc.) was added to the obtained liquid.

The obtained liquid was filtered using a filter having a mesh diameter of 1 μm, and the filtrate was collected, thereby obtaining an aqueous dispersion liquid of the acrylic resin particles IA-1 whose concentration of solid contents was 26.5% by mass.

The glass transition temperature (Tg) of the acrylic resin particles 1A-1 was 120° C., and the volume average particle diameter thereof was 10 nm.

In Example 1, the cyan ink was allowed to contain 8% by mass of acrylic resin particles 1A-1 in terms of the amount of the resin particles using the aqueous dispersion liquid of the acrylic resin particles 1A-1.

<Evaluation>

The following evaluation was performed using the pretreatment liquid and the ink described above.

The results are listed in Table 1.

(Preparation of Image Recording Device)

As the image recording device used for the evaluation, the image recording device illustrated in FIG. 1 according to the above-described example was prepared.

A gravure coater was used as the pretreatment liquid applying device A1.

Warm air drying was used as the drying method in the pretreatment liquid drying zone Dry1.

The ink jet head and the ink jetting conditions for the ink applying device IJ1 were as follows.

Ink jet head: 1200 dpi (dot per inch, 1 inch is 2.54 cm)/20-inch width piezo full line head (total number of nozzles: 2048) was used.

Ink droplet amount: Each amount was set to 2.4 pL.

Driving frequency: 30 kHz

Warm air drying was used as the drying method in the ink drying zone Dry2.

(Whitening of Film Derived from Pretreatment Liquid)

A polyethylene terephthalate (PET) base material "FE2001" (manufactured by Futamura Chemical Co., Ltd., a roll body in which a PET base material having a thickness of 25 μm, a width of 500 mm, and a length of 2000 m is wound in a roll shape; hereinafter, also referred to as a "roll body 1") was prepared as the impermeable base material S1.

The roll body 1 was set in the unwinding device W1 of the image recording device, and the above-described pretreatment liquid was set in the pretreatment liquid applying device A1 of this image recording device.

Next, the impermeable base material S1 (PET base material) was unwound from the roll body 1 by the unwinding device W1, and the unwound impermeable base material S1 was transported at a transport speed of 500 mm/sec. The entire one surface of the impermeable base material S1 during the transport was coated with the pretreatment liquid such that the coating amount thereof reached 1.5 g/$m^2$ (liquid coating amount; 0.1 to 0.2 g/$m^2$ in terms of dry coating amount) using a gravure coater as the pretreatment liquid applying device A1, and the applied pretreatment liquid was dried with warm air for 8 seconds in the pretreatment liquid drying zone Dry1 under a film surface temperature condition of 60° C.

The impermeable base material S1 (that is, the recording medium) that had been coated with the pretreatment liquid and dried was allowed to pass through the ink applying device IJ1 and the ink drying zone Dry2 (that is, the application and the drying of the ink were not performed), and the recording medium was wound by the winding device W2. Hereinafter, the wound recording medium will be referred to as a "roll body 2".

The roll body 2 was allowed to stand at 25° C. for 1 hour.

The recording medium was unwound from the roll body 2 that had been allowed to stand for 1 hour, and 15 sheets of samples having a size of 100 mm×100 mm were cut out from the unwound recording medium.

Figure 2:
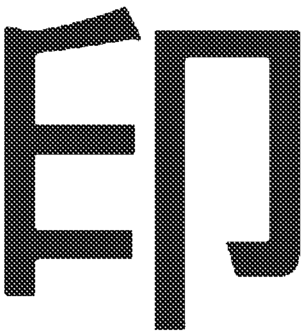
FIG. 2 is a black character image used for evaluation of whitening of a film derived from a pretreatment liquid in examples.

Next, white paper on which the black character image (size of 10 pt) shown in FIG. 2 was printed was prepared. In the present disclosure, pt indicates the DTP point representing the font size, and 1 pt is 1/72 inch.

A plurality of sheets of the samples were superimposed on the character image of the paper, and it was confirmed whether the details of the character image were able to be visually recognized. Based on the confirmed results, the whitening of the film derived from the pretreatment liquid was evaluated based on the following evaluation standards.

In the following evaluation standards, the rank in which the whitening of the film derived from the pretreatment liquid was most suppressed is "5".

Further, in a case where a PET film which had not been coated with the pretreatment liquid was used, the rank corresponds to "5".

—Evaluation Standards for Whitening of Film Derived from Pretreatment Liquid—

5: The details of the character image were able to be visually recognized even in a case where 13 to 15 sheets of samples were superimposed.

4: The details of the character image were not able to be visually recognized in a case where 13 or more sheets of samples were superimposed, but the details of the character image were able to be visually recognized in a case where 10 to 12 sheets of samples were superimposed.

3: The details of the character image were not able to be visually recognized in a case where 10 or more sheets of samples were superimposed, but the details of the character image were able to be visually recognized in a case where 8 or 9 sheets of samples were superimposed.

2: The details of the character image were not able to be visually recognized in a case where 8 or more sheets of samples were superimposed, but the details of the character image were able to be visually recognized in a case where 5 to 7 sheets of samples were superimposed.

1: The details of the character image were not able to be visually recognized in a case where 5 or more sheets of samples were superimposed.

(Stickiness of Film Derived from Pretreatment Liquid)

In the evaluation of the whitening of the film derived from the pretreatment liquid, the process up to the operation of drying the pretreatment liquid with warm air for 8 seconds was performed.

After the pretreatment liquid was dried for 8 seconds, a sample having a size of 50 mm×100 mm was cut out from the impermeable base material S1 (that is, the recording medium) which had been coated with the pretreatment liquid and dried.

The measurement of the logarithmic decrement at 25° C. was performed on the film derived from the pretreatment liquid in the cut-out sample using a rigid body pendulum viscoelasticity tester RPT-3000W, a rigid body pendulum (FRB-100 type), and a round bar type cylinder edge (RBP-060 type) (manufactured by A & D Company, Limited). Based on the measurement results, the stickiness of the film derived from the pretreatment liquid was evaluated based on the following evaluation standards.

In the following evaluation standards, the rank in which the stickiness of the film derived from the pretreatment liquid was most suppressed is "5".

—Evaluation Standards for Stickiness of Film Derived from Pretreatment Liquid—

5: The logarithmic decrement was less than 0.05.

4: The logarithmic decrement was 0.05 or greater and less than 0.06.

3: The logarithmic decrement was 0.06 or greater and less than 0.08.

2: The logarithmic decrement was 0.08 or greater and less than 0.1.

1: The logarithmic decrement was 0.1 or greater.

(Adhesiveness of Image)

The roll body 1 was set in the unwinding device W1 of the image recording device, and the above-described pretreatment liquid was set in the pretreatment liquid applying device A1 of this image recording device.

Next, the impermeable base material S1 (PET base material) was unwound from the roll body 1 by the unwinding device W1, and the unwound impermeable base material S1 was transported at a transport speed of 500 mm/sec. The entire one surface of the impermeable base material S1 during the transport was coated with the pretreatment liquid such that the coating amount thereof reached 1.5 $g/m^2$ (liquid coating amount; 0.1 $g/m^2$ to 0.2 $g/m^2$ in terms of dry coating amount) using a gravure coater as the pretreatment liquid applying device A1, and the applied pretreatment liquid was dried with warm air for 8 seconds in the pretreatment liquid drying zone Dry1 under a film surface temperature condition of 60° C.

In the impermeable base material S1 (that is, the recording medium) which had been coated with the pretreatment liquid and dried, the above-described cyan ink was applied by the ink applying device IJ1, in the form of a solid image, to a part of the region of the impermeable base material S1 where the pretreatment liquid had been applied and dried according to the ink jet method. Here, the region where the cyan ink was applied was set as a band-shaped region having a width of 250 mm with a central portion in the width direction as a center in a total width of 500 mm of the impermeable base material S1. Here, the mass of the cyan ink to be applied per unit area in the region where the cyan ink was applied was set to 3 $g/m^2$.

Next, the applied cyan ink was dried at 80° C. for 8 seconds in the ink drying zone Dry2.

As described above, a cyan solid image was recorded on the entire band-shaped region having a width of 250 mm described above. Each of the regions with a width of 125 mm at both ends of the impermeable base material S1 in the width direction was an image non-recorded region.

Next, the impermeable base material S1 (that is, the image recorded material) on which the cyan solid image had been recorded was wound by the winding device W2.

Hereinafter, the wound image recorded material will be referred to as a "roll body 3".

The roll body 3 was allowed to stand at 25° C. for 1 hour.

Next, the adhesiveness of the image was evaluated by unwinding the image recorded material from the roll body 3 that had been allowed to stand at 25° C. for 1 hour, attaching a piece of tape of Cellotape (registered trademark, No. 405, manufactured by Nichiban Co., Ltd., width of 12 mm, hereinafter, also simply referred to as "tape") onto the cyan solid image on the unwound image recorded material, and peeling the piece of tape off from the cyan solid image.

Specifically, the tape was attached and peeled off according to the following method.

The tape was taken out at a constant speed and cut to have a length of approximately 75 mm, thereby obtaining a piece of tape.

The obtained piece of tape was superimposed on the cyan solid image, and a region at the central portion of the piece of tape with a width of 12 nm and a length of 25 mm was attached onto the image using a finger and rubbed firmly with a fingertip.

The end of the piece of tape was grabbed in 5 minutes after attachment of the piece of tape and peeled at an angle as close to 600 as possible in 0.5 seconds to 1.0 seconds.

The presence or absence of adhesive matter on the piece of peeled tape and the presence or absence of peeling of the cyan solid image on the impermeable base material in the sample for evaluating the adhesiveness were visually observed, and the adhesiveness of the image was evaluated based on the following evaluation standards.

The results are listed in Table 1.

—Evaluation Standards for Adhesiveness of Image—

5: Adhesive matter was not found on the piece of tape, and peeling of the image on the impermeable base material was not found.

4: A small amount of colored adhesive matter was found on the piece of tape, but peeling of the image on the impermeable base material was not found.

3: A small amount of colored adhesive matter was found on the piece of tape, and slight peeling of the image on the impermeable base material was found, but it was in a practically acceptable range.

2: Colored adhesive matter was found on the piece of tape, peeling of the image on the impermeable base material was found, and it was out of a practically acceptable range.

1: Colored adhesive matter was found on the piece of tape, most of the image on the impermeable base material was peeled off, and the impermeable base material was visually recognized.

(Evaluation of Image Quality)

The following character images were recorded on a part of the recording medium (that is, the region where the pretreatment liquid had been applied onto the impermeable base material S1, which had been coated with the pretreatment liquid and dried, and dried) in the same manner as in the evaluation of the adhesiveness of the image except that the cyan ink was applied in the form of a character image.

The character images recorded on the recording medium were the character images (unicode: U+9DF9; 2 pt, 3 pt, 4 pt, and 5 pt) shown in FIG. 3.

The character image recorded on the recording medium was observed, and the image quality was evaluated based on the following evaluation standards.

The results are listed in Table 1.

In the following evaluation standards, the rank of the most excellent image quality is "5".

Evaluation Standards for Image Quality—

5: Characters having a size of 2 pt were able to be reproduced.

4: Characters having a size of 3 pt were able to be reproduced, but characters having a size of 2 pt were not able to be reproduced.
3: Characters having a size of 4 pt were able to be reproduced, but characters having a size of 3 pt or less were not able to be reproduced.
2: Characters having a size of 5 pt were able to be reproduced, but characters having a size of 4 pt or less were not able to be reproduced.
1: Characters having a size of 5 pt were not able to be reproduced.

Figure 3:
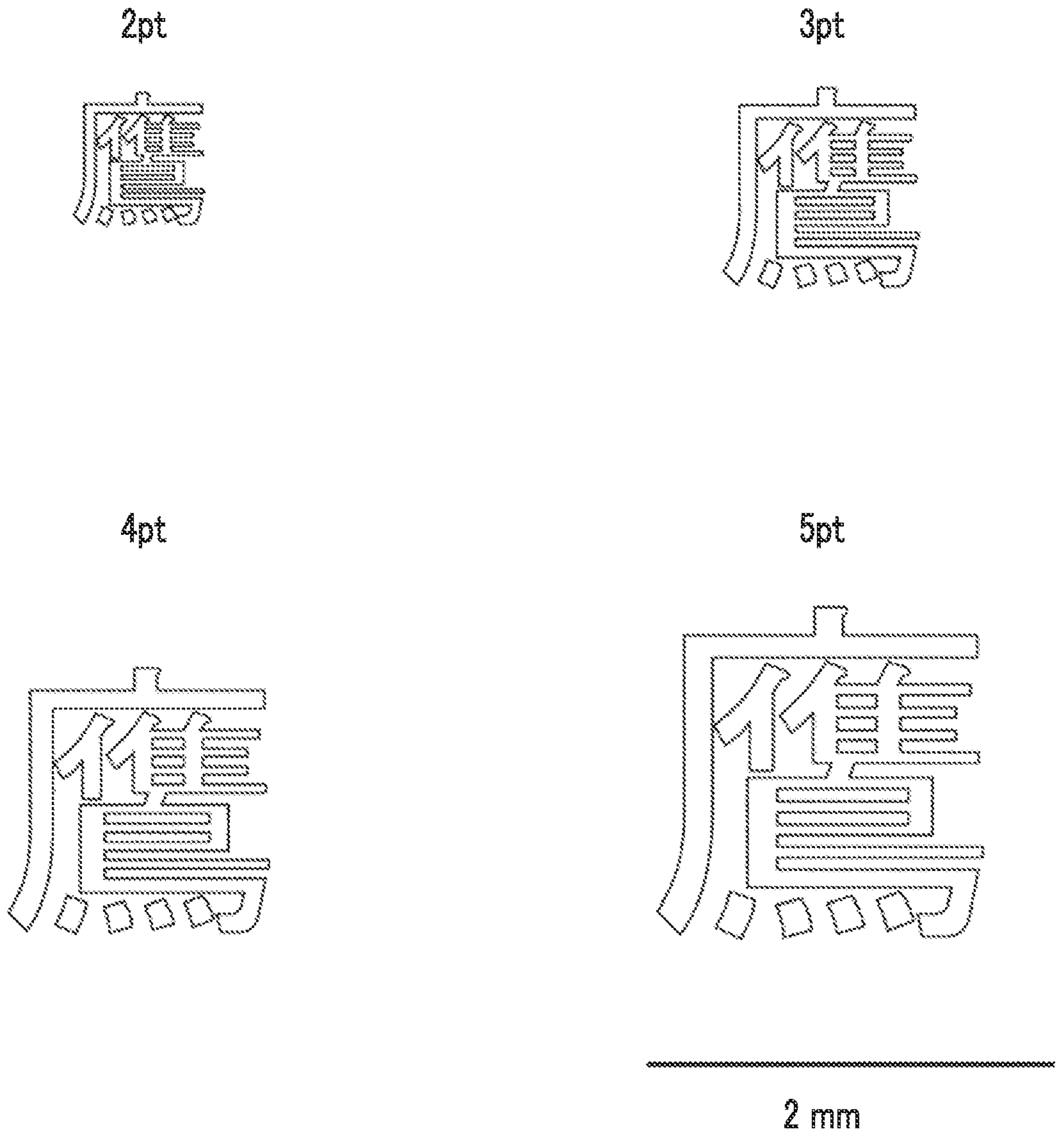
FIG. 3 is a view conceptually showing character images used for evaluation of the image quality in examples.
Figure 4:
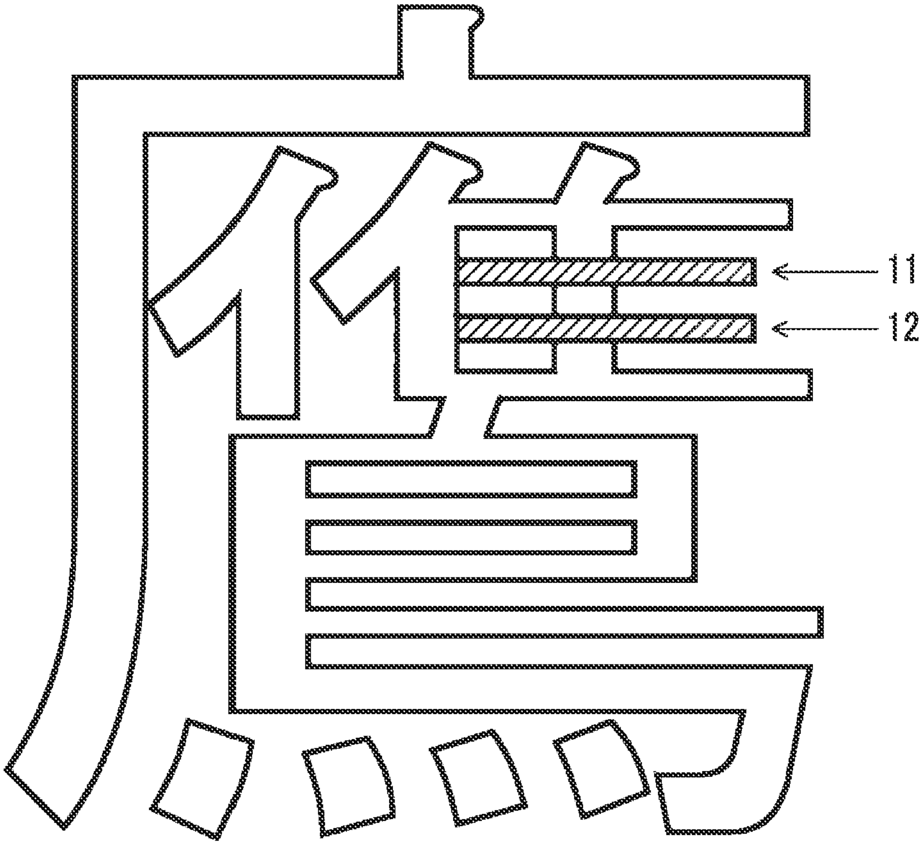
FIG. 4 is a view for explaining the details of the evaluation standards for the image quality in examples.

The expression of "was able to be reproduced" means that the horizontal line indicated by the reference numeral 11 in FIG. 4 and the horizontal line indicated by the reference numeral 12 in FIG. 4 are separated from each other in the character image of FIG. 3 as confirmed at a position separated by 0.5 m.

(Stability of Pretreatment Liquid)

The stability of the pretreatment liquid was evaluated in the following manner.

The viscosity of the pretreatment liquid that was allowed to stand at 25° C. for 1 hour after the preparation of the pretreatment liquid (hereinafter, referred to as the "viscosity before storage") and the viscosity of the pretreatment liquid that was stored in a sealed state at 50° C. for 14 days after the preparation of the pretreatment liquid (hereinafter, referred to as the "viscosity after storage") were respectively measured. Both the viscosity before storage and the viscosity after storage were measured under conditions of 25° C. at 100 revolutions per minute (rpm) using VISCOMETER TV-22 (manufactured by TOKI SANGYO CO. LTD). Here, the sealed state indicates a state in which the contents are sealed in a container and the amount of decrease in the mass of the contents is less than 1% by mass in a case where the contents are stored under the conditions of 50° C. for 14 days.

The value obtained by subtracting the viscosity before storage from the viscosity after storage was acquired, and the preservation stability of the ink was evaluated based on the following evaluation standards.

In the following evaluation standards, the rank of the most excellent preservation stability of the ink is "5".

—Evaluation Standards for Preservation Stability of Pretreatment Liquid—

5: The value obtained by subtracting the viscosity before storage from the viscosity after storage was less than 0.3 mPa·s.
4: The value obtained by subtracting the viscosity before storage from the viscosity after storage was 0.3 mPa·s or greater and less than 0.5 mPa·s.
3: The value obtained by subtracting the viscosity before storage from the viscosity after storage was 0.5 mPa·s or greater and less than 1.0 mPa·s.
2: The value obtained by subtracting the viscosity before storage from the viscosity after storage was 1.0 mPa·s or greater and less than 2.0 mPa·s.
1: The value obtained by subtracting the viscosity before storage from the viscosity after storage was 2.0 mPa·s or greater.

Examples 2 to 18

The same operation as in Example 1 was performed except that the combination of the type and the amount of the aggregating agent (A), the combination of the type and the amount of the nitrogen-containing compound (B), and the type and the amount of the resin particles (C) in the pretreatment liquid were changed as listed in Table 1.

The results are listed in Table 1.

The amount (%) of each component in Table 1 is the content (% by mass) thereof with respect to the total amount of the pretreatment liquid.

The details of each component in Table 1 are as follows.

Malonic acid . . . malonic acid (manufactured by Fujifilm Wako Pure Chemical Corporation), dicarboxylic acid
Glutaric acid . . . glutaric acid (manufactured by Fujifilm Wako Pure Chemical Corporation), dicarboxylic acid
Calcium chloride . . . calcium chloride (manufactured by Fujifilm Wako Pure Chemical Corporation), polyvalent metal salt
Lactic acid . . . lactic acid (manufactured by Fujifilm Wako Pure Chemical Corporation), monocarboxylic acid
TIPA . . . triisopropanolamine (manufactured by Fujifilm Wako Pure Chemical Corporation)
ID . . . imidazole (manufactured by Fujifilm Wako Pure Chemical Corporation)
AA . . . ammonia in ammonia water (25% by mass of ammonia) (manufactured by Fujifilm Wako Pure Chemical Corporation)
DMEA . . . N,N-dimethylethanolamine (manufactured by Fujifilm Wako Pure Chemical Corporation)
DEA . . . diethanolamine (manufactured by Fujifilm Wako Pure Chemical Corporation)
EA . . . monoethanolamine (manufactured by Fujifilm Wako Pure Chemical Corporation)
TEA . . . triethylamine (manufactured by Fujifilm Wako Pure Chemical Corporation)
ADHD (comparative compound) . . . adipic acid dihydrazide (manufactured by Fujifilm Wako Pure Chemical Corporation)
Acrylic A1 . . . acrylic resin particles A1 shown above
Ester E1 . . . ester resin particles E1 shown below
Urethane U1 . . . urethane resin particles U1 shown below
Olefin O1 . . . olefin resin particles O1 shown below
Polyacrylic acid (comparative resin) . . . polyacrylic acid shown below Ester Resin Particles E1—

The ester resin particles E1 are ester resin particles in an aqueous dispersion liquid "Eastek™ 1200" of ester resin particles (volume average particle diameter of 30 nm, manufactured by Eastman Chemical Company).

In the preparation of the pretreatment liquid, the pretreatment liquid was allowed to contain the ester resin particles E1 in the amount listed in Table 1 using the aqueous dispersion liquid.

—Urethane Resin Particles U1—

The urethane resin particles U1 are urethane resin particles in a polyurethane aqueous dispersion "SUPERFLEX 650" (manufactured by DKS Co., Ltd.).

In the preparation of the pretreatment liquid, the pretreatment liquid was allowed to contain the urethane resin particles U1 in the amount listed in Table 1 using the aqueous dispersion liquid.

—Olefin Resin Particles O1—

The olefin resin particles O1 are olefin resin particles in an aqueous dispersion liquid "SUPERCHLON W-415" of olefin resin particles (manufactured by Nippon Paper Industries, Co., Ltd.).

In the preparation of the pretreatment liquid, the pretreatment liquid was allowed to contain the olefin resin particles O1 in the amount listed in Table 1 using the aqueous dispersion liquid.

—Polyacrylic Acid (Comparative Resin)—

The polyacrylic acid is polyacrylic acid in a polyacrylic acid aqueous solution "ARON A-10H" (manufactured by Toagosei Co., Ltd.).

In the preparation of the pretreatment liquid, the pretreatment liquid was allowed to contain the polyacrylic acid (comparative resin) in the amount listed in Table 1 using the aqueous solution.

Comparative Example 1

The same operation as in Example 2 was performed except that the pretreatment liquid did not contain triisopropanolamine (TIPA).

The results are listed in Table 1.

Comparative Example 2

The same operation as in Example 2 was performed except that the acrylic resin particles A1 in the pretreatment liquid were changed to the same mass of polyacrylic acid (water-soluble resin; comparative resin) in terms of the amount of the resin.

The results are listed in Table 1.

Comparative Example 3

The same operation as in Example 2 was performed except that the pretreatment liquid did not contain the acrylic resin particles A1.

The results are listed in Table 1.

Comparative Example 4

The same operation as in Example 2 was performed except that the triisopropanolamine (TIPA) in the pretreatment liquid was changed to the same mass of adipic acid dihydrazide (ADHD; comparative compound).

The results are listed in Table 1.

TABLE 1

| | Pretreatment liquid | | | | | | | | |
|---|---|---|---|---|---|---|---|---|---|
| | Aggregating agent (A) | | Nitrogen-containing compound (B) or comparative compound | | | | | Resin particles (C) or comparative resin | |
| | Type | Amount (%) | Type | Boiling point (° C.) | Number of OH groups | Series | Amount (%) | Type | Amount (%) |
| Example 1 | Malonic acid | 4.0 | TIPA | 249 | 3 | 3 | 0.5 | Acrylic A1 | 8.0 |
| Example 2 | Glutaric acid | 4.0 | TIPA | 249 | 3 | 3 | 0.5 | Acrylic Al | 8.0 |
| Example 3 | Glutaric acid | 4.0 | ID | 256 | 0 | — | 0.5 | Acrylic A1 | 8.0 |
| Example 4 | Glutaric acid | 4.0 | TIPA | 249 | 3 | 3 | 0.5 | Urethane U1 | 8.0 |
| Example 5 | Glutaric acid | 4.0 | TIPA | 249 | 3 | 3 | 0.5 | Ester E1 | 8.0 |
| Example 6 | Calcium chloride | 4.0 | TIPA | 249 | 3 | 3 | 0.5 | Ester E1 | 8.0 |
| Example 7 | Glutaric acid | 4.0 | AA | −33 | 3 | 3 | 0.2 | Acrylic A1 | 8.0 |
| Example 8 | Glutaric acid | 4.0 | DMEA | 133 | 1 | 3 | 0.5 | Ester E1 | 8.0 |
| Example 9 | Glutaric acid | 4.0 | DEA | 217 | 2 | 2 | 0.5 | Acrylic A1 | 8.0 |
| Example 10 | Glutaric acid | 4.0 | EA | 170 | 1 | 1 | 0.5 | Acrylic A1 | 8.0 |
| Example 11 | Glutaric acid | 4.0 | TEA | 89 | 0 | 3 | 0.5 | Acrylic A1 | 8.0 |
| Example 12 | Lactic acid | 4.0 | TIPA | 249 | 3 | 3 | 0.5 | Acrylic A1 | 8.0 |
| Example 13 | Glutaric acid | 4.0 | TIPA | 249 | 3 | 3 | 0.5 | Olefin O1 | 8.0 |
| Example 14 | Glutaric acid | 2.0 | TIPA | 249 | 3 | 3 | 3.0 | Acrylic Al | 8.0 |
| Example 15 | Glutaric acid | 2.0 | TIPA | 249 | 3 | 3 | 4.0 | Acrylic A1 | 8.0 |
| Example 16 | Glutaric acid | 2.0 | TIPA | 249 | 3 | 3 | 5.0 | Acrylic A1 | 8.0 |
| Example 17 | Glutaric acid | 4.0 | TIPA | 249 | 3 | 3 | 0.5 | Acrylic A1 | 3.0 |
| Example 18 | Glutaric acid | 4.0 | TIPA | 249 | 3 | 3 | 2.5 | Acrylic A1 | 3.0 |
| Comparative Example 1 | Glutaric acid | 4.0 | None | — | — | — | 0.0 | Acrylic A1 | 8.0 |
| Comparative Example 2 | Glutaric acid | 4.0 | TIPA | 249 | 3 | 3 | 0.5 | Polyacrylic acid (comparative resin) | 8.0 |
| Comparative Example 3 | Glutaric acid | 4.0 | TIPA | 249 | 3 | 3 | 0.5 | None | 0.0 |
| Comparative Example 4 | Glutaric acid | 4.0 | ADHD (comparative compound) | — | — | — | 0.5 | Acrylic A1 | 8.0 |

| | Pretreatment liquid | | | | Evaluation results | | | | |
|---|---|---|---|---|---|---|---|---|---|
| | Number of moles of acid group of A/number of moles of basic N atoms of B | Amount ratio [C/A] | Amount ratio [A/B] | Amount ratio [C/B] | Whitening | Stickiness | Adhesiveness | Image quality | Stability |
| Example 1 | 29.4 | 2.0 | 8.0 | 16.0 | 5 | 5 | 5 | 5 | 5 |
| Example 2 | 23.2 | 2.0 | 8.0 | 16.0 | 5 | 5 | 5 | 5 | 5 |
| Example 3 | 8.2 | 2.0 | 8.0 | 16.0 | 4 | 5 | 5 | 5 | 4 |
| Example 4 | 23.2 | 2.0 | 8.0 | 16.0 | 5 | 5 | 5 | 5 | 5 |
| Example 5 | 23.2 | 2.0 | 8.0 | 16.0 | 5 | 5 | 5 | 5 | 5 |
| Example 6 | — | 2.0 | 8.0 | 16.0 | 5 | 4 | 5 | 4 | 5 |

TABLE 1-continued

| | | | | | | | | | |
|---|---|---|---|---|---|---|---|---|---|
| Example 7 | 5.2 | 2.0 | 20.0 | 40.0 | 4 | 5 | 5 | 5 | 5 |
| Example 8 | 10.8 | 2.0 | 8.0 | 16.0 | 5 | 5 | 5 | 5 | 5 |
| Example 9 | 12.7 | 2.0 | 8.0 | 16.0 | 5 | 5 | 5 | 5 | 5 |
| Example 10 | 7.4 | 2.0 | 8.0 | 16.0 | 5 | 5 | 5 | 5 | 3 |
| Example 11 | 12.2 | 2.0 | 8.0 | 16.0 | 4 | 5 | 5 | 5 | 4 |
| Example 12 | 34.0 | 2.0 | 8.0 | 16.0 | 5 | 4 | 5 | 3 | 5 |
| Example 13 | 23.2 | 2.0 | 8.0 | 16.0 | 3 | 5 | 4 | 5 | 5 |
| Example 14 | 1.9 | 4.0 | 0.7 | 2.7 | 5 | 5 | 5 | 4 | 3 |
| Example 15 | 1.4 | 4.0 | 0.5 | 2.0 | 5 | 5 | 4 | 4 | 3 |
| Example 16 | 1.2 | 4.0 | 0.4 | 1.6 | 5 | 5 | 3 | 3 | 3 |
| Example 17 | 23.2 | 0.8 | 8.0 | 6.0 | 4 | 5 | 3 | 5 | 5 |
| Example 18 | 4.6 | 0.8 | 1.6 | 1.2 | 4 | 4 | 3 | 5 | 3 |
| Comparative Example 1 | — | 2.0 | — | — | 1 | 4 | 5 | 5 | 3 |
| Comparative Example 2 | 23.2 | 2.0 | 8.0 | 16.0 | 4 | 2 | 4 | 3 | 5 |
| Comparative Example 3 | 23.2 | 0.0 | 8.0 | 0.0 | 2 | 4 | 1 | 5 | 5 |
| Comparative Example 4 | 23.2 | 2.0 | 8.0 | 16.0 | 2 | 4 | 5 | 5 | 3 |

As listed in Table 1, in each example in which the pretreatment liquid containing an aggregating agent (A) which contained at least one selected from the group consisting of an organic acid and a polyvalent metal salt, a nitrogen-containing compound (B) which contained at least one selected from the group consisting of ammonia, an amine, and a heterocyclic compound containing a basic nitrogen atom, resin particles (C), and water was used, whitening and stickiness of the film derived from the pretreatment liquid were suppressed.

In Comparative Example 1 in which the pretreatment liquid that did not contain the nitrogen-containing compound (B) was used, the whitening of the film was significant as compared with each example.

Further, in Comparative Example 2 in which the pretreatment liquid containing the water-soluble resin (comparative resin) in place of the resin particles (C) was used, the stickiness was significant.

Further, in Comparative Example 3 in which the pretreatment liquid that did not contain the resin particles (C) was used, the whitening of the film was significant and the adhesiveness of the image was decreased.

Further, in Comparative Example 4 in which the pretreatment liquid containing adipic acid dihydrazide, which was a comparative compound, in place of the nitrogen-containing compound (B) was used, the whitening of the film was significant. The reason for this is considered to be that the adipic acid dihydrazide has a weaker basicity than that of the nitrogen-containing compound (B).

As shown in the results of Examples 8 and 11, it was found that the whitening of the film was further suppressed in a case where the nitrogen-containing compound (B) contained an amine having a boiling point of 100° C. or higher (Example 8).

As shown in the results of Examples 8 and 11, it was found that the whitening of the film was further suppressed and the stability of the pretreatment liquid was further improved in a case where the nitrogen-containing compound (B) contained an amine containing a hydroxy group (Example 8).

As shown in the results of Examples 8 to 10, it was found that the stability of the pretreatment liquid was further improved in a case where the nitrogen-containing compound (B) contained at least one selected from the group consisting of a secondary amine and a tertiary amine (Examples 8 and 9).

As shown in the results of Examples 1 and 12, it was found that the image quality of the image was further improved in a case where the aggregating agent (A) contained at least one selected from the group consisting of a dicarboxylic acid and a tricarboxylic acid (Example 1).

As shown in the results of Examples 2, 4, 5, and 13, it was found that the whitening of the film was further suppressed and the adhesiveness of the image was further improved in a case where the resin particles (C) contained at least one selected from the group consisting of an acrylic resin, an ester resin, and an urethane resin (Examples 2, 4, and 5).

As shown in the results of Examples 15 and 16, it was found that the adhesiveness and the image quality of the image were improved in a case where the aggregating agent (A) contained an organic acid and the ratio of the number of moles of the acid group of the organic acid to the number of moles of the basic nitrogen atom of the nitrogen-containing compound (B) (that is, "number of moles of acid group of A/number of moles of basic N atom of B" in Table 1) was 1.3 or greater (Example 15).

As shown in the results of Examples 2 and 17, it was found that the whitening of the film was further suppressed and the adhesiveness of the image was further improved in a case where the relationship of "mass content of resin particles (C)>mass content of aggregating agent (A)" was satisfied (that is, the amount ratio [C/A] in Table 1 was greater than 1) (Example 2).

As shown in the results of Examples 14 to 16 and 18, it was found that the image quality of the image was further improved in a case where the relationship of "mass content of aggregating agent (A)>mass content of nitrogen-containing compound (B)" was satisfied (that is, the amount ratio [A/B] in Table 1 was greater than 1) (Example 18).

As shown in the results of Examples 17 and 18, it was found that the stickiness of the film was further suppressed and the stability of the pretreatment liquid was further improved in a case where the relationship of "mass content of resin particles (C)>mass content of nitrogen-containing compound (B)×1.5" was satisfied (that is, the amount ratio [C/B] in Table 1 was 1.5 or greater) (Example 17).

The disclosure of JP2019-094050 filed on May 17, 2019 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:

1. A pretreatment liquid for an impermeable base material, comprising:

an aggregating agent (A) which comprises at least one organic acid;

a nitrogen-containing compound (B) which comprises an amine and optionally at least one selected from the group consisting of ammonia and a heterocyclic compound comprising a basic nitrogen atom;

resin particles (C); and water, wherein the aggregating agent (A) comprises at least one selected from the group consisting of a dicarboxylic acid and a tricarboxylic acid, a ratio of the number of moles of an acid group of the organic acid to the number of moles of the basic nitrogen atom of the nitrogen-containing compound (B) is 1.3 or greater, the resin particles (C) are an acrylic resin, a content of the resin particles (C) is in a range of from 3% by mass to 15% by mass with respect to a total amount of the pretreatment liquid, a mass content of the resin particles (C) and a mass content of the aggregating agent (A) satisfy a relationship of an amount ratio of the mass content of the resin particles (C) to the mass content of the aggregating agent (A) is greater than 1 and 4 or less, and the mass content of the resin particles (C) and a mass content of the nitrogen-containing compound (B) satisfy a relationship of an amount ratio of the mass content of resin particles (C) to the mass content of nitrogen-containing compound (B) is greater than 1.5 and 40 or less.

2. The pretreatment liquid for an impermeable base material according to claim 1, wherein the nitrogen-containing compound (B) comprises an amine having a boiling point of 100° C. or higher.

3. The pretreatment liquid for an impermeable base material according to claim 1, wherein the nitrogen-containing compound (B) comprises an amine having a hydroxy group.

4. The pretreatment liquid for an impermeable base material according to claim 1, wherein the nitrogen-containing compound (B) comprises at least one selected from the group consisting of a secondary amine and a tertiary amine.

5. The pretreatment liquid for an impermeable base material according to claim 1, wherein a mass content of the aggregating agent (A) and a mass content of the nitrogen-containing compound (B) satisfy a relationship of "mass content of aggregating agent (A)>mass content of nitrogen-containing compound (B)".

6. An ink set comprising:

the pretreatment liquid for an impermeable base material according to claim 1; and an ink comprising a colorant and water.

7. An image recording method comprising:

applying the pretreatment liquid for an impermeable base material according to claim 1 onto an impermeable base material to form a film; and applying an ink comprising a colorant and water to a part of the film to record an image.

8. An image recorded material comprising:

an impermeable base material;

a film disposed on the impermeable base material; and an image disposed on a part of the film and comprising a colorant, wherein the film comprises an aggregating agent (A) comprising at least organic acid, a nitrogen-containing compound (B) comprising an amine and optionally at least one selected from the group consisting of ammonia, and a heterocyclic compound that comprises a basic nitrogen atom, and resin particles (C), wherein the aggregating agent (A) comprises at least one selected from the group consisting of a dicarboxylic acid and a tricarboxylic acid, a ratio of the number of moles of an acid group of the organic acid to the number of moles of the basic nitrogen atom of the nitrogen-containing compound (B) is 1.3 or greater, the resin particles (C) are an acrylic resin, a content of the resin particles (C) is in a range of from 3% by mass to 15% by mass with respect to a total amount of the pretreatment liquid, a mass content of the resin particles (C) and a mass content of the aggregating agent (A) satisfy a relationship of an amount ratio of the mass content of the resin particles (C) to the mass content of the aggregating agent (A) is greater than 1 and 4 or less, and the mass content of the resin particles (C) and a mass content of the nitrogen-containing compound (B) satisfy a relationship of an amount ratio of the mass content of resin particles (C) to the mass content of nitrogen-containing compound (B) is greater than 1.5 and 40 or less.

9. A method of producing a recording medium, comprising:

applying the pretreatment liquid for an impermeable base material according to claim 1 onto an impermeable base material to form a film.

10. A recording medium comprising:

an impermeable base material; and a film disposed on the impermeable base material, wherein the film comprises an aggregating agent (A) comprising at least one organic acid, a nitrogen-containing compound (B) comprising an amine and optionally at least one selected from the group consisting of ammonia and a heterocyclic compound that comprises a basic nitrogen atom, and resin particles (C), wherein the aggregating agent (A) comprises at least one selected from the group consisting of a dicarboxylic acid and a tricarboxylic acid, a ratio of the number of moles of an acid group of the organic acid to the number of moles of the basic nitrogen atom of the nitrogen-containing compound (B) is 1.3 or greater, the resin particles (C) are an acrylic resin, a content of the resin particles (C) is in a range of from 3% by mass to 15% by mass with respect to a total amount of the pretreatment liquid, a mass content of the resin particles (C) and a mass content of the aggregating agent (A) satisfy a relationship of an amount ratio of the mass content of the resin particles (C) to the mass content of the aggregating agent (A) is greater than 1 and 4 or less, and the mass content of the resin particles (C) and a mass content of the nitrogen-containing compound (B) satisfy a relationship of an amount ratio of the mass content of resin particles (C) to the mass content of nitrogen-containing compound (B) is greater than 1.5 and 40 or less.

11. The pretreatment liquid for an impermeable base material according to claim 1, wherein a proportion of the amine in a total amount of the nitrogen-containing compound (B) is in a range of from 50% by mass to 100% by mass.

12. The pretreatment liquid for an impermeable base material according to claim 1, wherein a pKb of the nitrogen-containing compound (B) is 6 or less.

* * * * *